(12) United States Patent
Udayakumar et al.

(10) Patent No.: US 10,848,664 B2
(45) Date of Patent: Nov. 24, 2020

(54) IMAGE CAPTURE DEVICE AND METHOD FOR IMAGE SCORE-BASED VIDEO QUALITY ENHANCEMENT

(71) Applicant: SONY CORPORATION, Tokyo (JP)

(72) Inventors: Kanimozhi Udayakumar, Bangalore (IN); Sandeep Rajarathnam, Bangalore (IN); Prashanth Puttamalla, Bangalore (IN); Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 84 days.

(21) Appl. No.: 16/046,030

(22) Filed: Jul. 26, 2018

(65) Prior Publication Data

US 2020/0036889 A1 Jan. 30, 2020

(51) Int. Cl.
*H04N 5/232* (2006.01)

(52) U.S. Cl.
CPC ..... *H04N 5/23222* (2013.01); *H04N 5/23216* (2013.01); *H04N 5/23238* (2013.01); *H04N 5/232935* (2018.08)

(58) Field of Classification Search
CPC ......... H04N 5/23222; H04N 5/232935; H04N 5/23216; H04N 5/23238
USPC .......................................................... 348/38
See application file for complete search history.

(56) References Cited

U.S. PATENT DOCUMENTS

| | | | |
|---|---|---|---|
| 7,693,304 B2 | 4/2010 | Obrador | |
| 9,262,696 B2 | 2/2016 | Ratcliff et al. | |
| 9,723,253 B2 | 8/2017 | Tsujimoto | |
| 2006/0017820 A1 | 1/2006 | Kim | |
| 2015/0364158 A1* | 12/2015 | Gupte | G11B 27/3081 386/223 |
| 2016/0028950 A1* | 1/2016 | Perazzi | H04N 5/23238 348/38 |

(Continued)

FOREIGN PATENT DOCUMENTS

| | | |
|---|---|---|
| CN | 109983759 A | 7/2019 |
| EP | 3535964 A1 | 9/2019 |

(Continued)

OTHER PUBLICATIONS

International Search Report and Written Opinion of PCT Application No. PCT/IB2019/055942, dated Mar. 4, 2020, 18 pages of ISRWO.

*Primary Examiner* — Patricia I Young
(74) *Attorney, Agent, or Firm* — Chip Law Group

(57) ABSTRACT

A first image capture device includes a display that renders a preview of a scene and a processor that determines a cumulative image score associated with each camera setting for a specified time period, based on the rendered preview. The processor captures a first video segment of a video using a first camera setting. The first camera setting is associated with a first cumulative image score equal to or greater than a set image score threshold. The processor detects a change in the first cumulative image score to a second cumulative image score for an upcoming video segment, based on a video buffer. The second cumulative image score is less than the set image score threshold. The processor captures a second video segment corresponding to the upcoming video segment using a second camera setting to maintain the cumulative image score equal to or greater than the set image score threshold.

18 Claims, 11 Drawing Sheets

(56) References Cited

U.S. PATENT DOCUMENTS

2016/0269675 A1\* 9/2016 Tsujimoto .............. H04N 5/772
2018/0124299 A1   5/2018 Brook
2018/0124300 A1   5/2018 Brook
2019/0379818 A1  12/2019 Brook

FOREIGN PATENT DOCUMENTS

KR   10-2019-0069578 A   6/2019
WO      2018/085426 A1   5/2018

\* cited by examiner

IMAGE CAPTURE DEVICE AND METHOD FOR IMAGE SCORE-BASED VIDEO QUALITY ENHANCEMENT

CROSS-REFERENCE TO RELATED APPLICATIONS/INCORPORATION BY REFERENCE

None.

FIELD

Various embodiments of the disclosure relate to image capturing technologies. More specifically, various embodiments of the disclosure relate to an image capture device and method for image score-based video quality enhancement.

BACKGROUND

Recent advancements in the field of image sensors and digital image capturing technologies have led to rapid increase in the resolution and quality of the captured images and video. In certain scenarios, a user may first focus on one scene and then focus and capture another scene in a field-of-view of a conventional image capture device. Various factors determine whether a captured image or video will have a desired quality level or not. Further, in case of a video, not all image frames may have same or similar quality level. Examples of such factors include, but are not limited to adequate settings for exposure, ISO, sharpness, distance of objects that are to be captured, image sensor resolution capability, lighting conditions, movement of objects that are captured or movement of camera during capture, etc. The quality of image frames during a capture of the image or video may deteriorate due to the misconfiguration of such settings. In certain cases, it may be required to maintain a similar quality level throughout the capture of a video. Existing technologies with respect to capture of image or video, utilize preset camera settings or one-time settings to capture a scene as an image or video. However, it may be difficult to achieve such desired quality level consistently for all or majority of the image frames of a video during capture of the video using conventional image capture device. Certain attempts have been made to evaluate an image or video captured by a camera based on the plurality of parameters of the camera, such as brightness, shutter speed, saturation, sharpness, and the like. However, such image evaluation techniques mostly evaluate images or video after capture, which leads to a situation where a user needs to capture the image or video again, based on modification of the values of the camera parameters to achieve the desired quality, which may still be inaccurate as a result of a change in scene or the various factors. The user may have to adjust the camera setting each time the video capture begins or may have to execute post processing image and video changes, which may be tiresome and may also introduce certain unwanted image/video artifacts.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for image score-based video quality enhancement is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
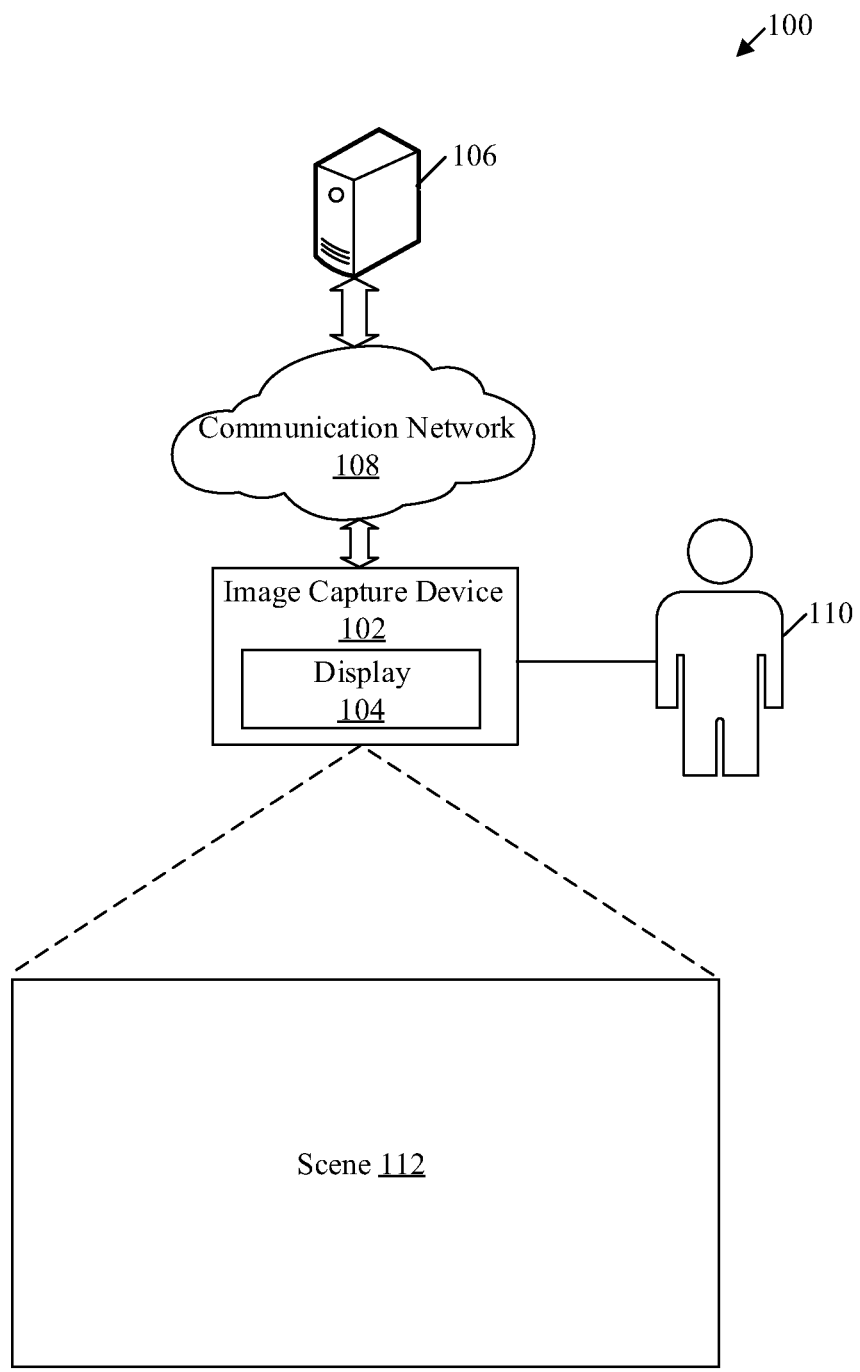
FIG. 1 is a block diagram that illustrates an exemplary network environment for the image score-based video quality enhancement, in accordance with an embodiment of the disclosure.

The following described implementations may be found in the disclosed apparatus and method for image score-based video quality enhancement. Exemplary aspects of the disclosure provide a first image capture device that may include a display configured to render a preview of a scene in a preview mode. The first image capture device may further include a processor configured to determine a cumulative image score associated with each camera setting of a plurality of camera settings for a specified time period in the preview mode, based on the rendered preview. Each camera setting may be a different combination of a plurality of camera parameters. The processor may be further configured to capture a first video segment of a video, in a capture mode that is different from the preview mode, using a first camera setting of the plurality of camera settings. The first camera setting may be associated with a first cumulative image score that is equal to or greater than a set image score threshold. The set image score threshold may be a user-defined image score threshold in the preview mode or a default image score threshold value preset by a manufacturer of the first image capture device.

In contrast to conventional systems, the processor may be configured to detect a change in the first cumulative image score to a second cumulative image score for an upcoming video segment to be captured using the first camera setting. The change may be detected based on a video buffer of the upcoming video segment of the video, such that the second cumulative image score is less than the set image score threshold. Thereby, the processor may be configured to capture a second video segment that may correspond to the upcoming video segment of the video using a second camera setting of the plurality of camera settings to maintain the cumulative image score equal to or greater than the set image score threshold. The cumulative image score indicates a quality of each of the plurality of frames of the video during capture. Therefore, the first image capture device may be configured to enhance the video dynamically during the capture mode In some embodiments, the processor may be further configured to select a plurality of region-of-interests (RoI) in the rendered preview, based on a user selection. Therefore, the first image capture device can be utilized to evaluate a RoI selected by the user in the rendered preview of the video based on the cumulative image score and enhance the selected RoI during capture of the video. The first image capture device may be further configured to generate a quick response (QR) code that includes the determined cumulative image score for different video segments of the video, the set image score threshold, information related to different camera settings used to capture the video, and a plurality of physical attributes of the first image capture device. The QR code may further include a RoI image score that may be determined for the selected RoI and information related to the coordinates of the selected RoI in a two dimensional (2D) space. The generated QR code may be stored in a server or a cloud, that may be utilized by the user in future to determine the first camera setting associated with the first cumulative image score, that is greater than the set image score threshold.

FIG. 1 is a block diagram that illustrates an exemplary network environment for the image score-based video quality enhancement, in accordance with an embodiment of the disclosure. With reference to FIG. 1, there is shown a network environment 100. The network environment 100 may include a first image capture device 102, a display 104, a server 106, and a communication network 108. A first user 110 may be associated with the first image capture device 102 to capture a video or an image of a scene 112. In some embodiments, the first image capture device 102 may include the display 104. In some embodiments, the display 104 may be an external device communicatively coupled to the first image capture device 102, via the communication network 108. The first image capture device 102 may be communicatively coupled to the server 106, via the communication network 108.

The first image capture device 102 may comprise suitable logic, circuitry, and interfaces that may be configured to capture an image or a video of the scene 112. The first image capture device 102 may be configured to render a preview of the scene 112 in a preview mode. The first image capture device 102 may be further configured to determine a cumulative image score associated with each camera setting of a plurality of camera settings for a specified time period in the preview mode, based on the rendered preview. Examples of the first image capture device 102 may include, but are not limited to, a camera, a smartphone, a video recorder, an image sensor, a color sensor (such as a red-green-blue (RGB) sensor), and the like.

The display 104 may comprise suitable logic, circuitry, and interfaces that may be configured to render the preview of the scene 112 captured by the first image capture device 102. In some embodiments, the display 104 may be a touch screen, which may enable the first user 110 to provide input via the display 104. The touch screen may be at least one of a resistive touch screen, a capacitive touch screen, or a thermal touch screen. The display 104 may be realized through several known technologies such as, but not limited to, at least one of a Liquid Crystal Display (LCD) display, a Light Emitting Diode (LED) display, a plasma display, or an Organic LED (OLED) display technology, or other display screen. In accordance with an embodiment, the display 104 may refer to, but not limited to, a display screen of a head mounted device (HMD), a smart-glass device, a see-through display, a projection-based display, an electrochromic display, or a transparent display.

The server 106 may comprise suitable logic, circuitry, and interfaces that may be configured to store captured images, videos, and associated image scores of the captured images or videos. Examples of the server 106 may include, but are not limited to a database server, a file server, a web server, a cloud server, an application server, a mainframe server, or other types of server.

The communication network 108 may include a communication medium through which the first image capture device 102 and the server 106, may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the first image capture device 102 may be configured to capture a preview of the scene 112 in a preview mode. The preview may include a plurality of preview image frames of the scene 112 rendered on the display 104. In some embodiments, the first image capture device 102 may include a viewfinder through which the preview may be visualized. The plurality of preview image frames may be rendered on the display 104 before an actual capture of the scene 112 as a video or an image.

The first image capture device 102 may be configured to evaluate the rendered preview of the scene 112. To evaluate the rendered preview, the first image capture device 102 may be configured to determine a cumulative image score associated with each camera setting of a plurality of camera settings for a specified time in the preview mode of the first image capture device 102. The cumulative image score associated with each camera setting of the plurality of camera settings may be determined based on the rendered preview of the scene 112 on the display 104. The determined cumulative image score may indicate a quality level of each video frame of the preview of the scene 112 rendered on the display 104. Each camera setting of the plurality of camera settings may be a different combination of a plurality of camera parameters. The plurality of camera parameters may correspond to, but not limited to, an exposure value, a sharpness value, a shutter speed value, or a camera International Organization for Standardization (ISO) value. In accordance with an embodiment, the plurality of camera parameters may also correspond to, but not limited to, a texture value, a noise value, a contrast value, a bokeh value, an aperture value, a focal length value, and a resolution of an image sensor of the first image capture device 102.

In accordance with an embodiment, the first image capture device 102 may be configured to determine a score for each camera parameter of the plurality of camera parameters for each rendered image of the rendered preview in the preview mode. The determined score of each camera parameter of the plurality of camera parameters may affect the cumulative image score. The first image capture device 102 may be further configured to modify a value of a first camera parameter of the plurality of camera parameters when the determined score of the first camera parameter may be a lowest score among a plurality of scores for the plurality of camera parameters. The lowest score indicate that the first camera parameter may be set at a certain value that is incorrect to capture the scene 112. Thus, the value of the first camera parameter may be modified to increase the score of the first camera parameter to be equal or similar to the scores of other camera parameters of the plurality of camera parameters. At least one new camera setting (e.g., an optimized camera setting) of the plurality of camera settings, may be generated based on the modification of the score of the first camera parameter in the first image capture device 102.

In accordance with an embodiment, the first image capture device 102 may be configured to capture a first video segment of a video. The first video segment of the video may be captured in a capture mode of the first image capture device 102 that is different from the preview mode of the first image capture device 102. The first video segment of the video may be captured using a first camera setting of the plurality of camera settings. The first camera setting may be associated with a first cumulative image score that is equal to or greater than a set image score threshold. The first cumulative image score may indicate a first quality level of the first video segment captured using the first camera setting. The set image score threshold may be at least one of a user-defined image score threshold in the preview mode or a default image score threshold value preset by a manufacturer of the first image capture device 102. The set image score threshold may indicate a desired or required quality level of the video.

In accordance with an embodiment, the first image capture device 102 may be configured to detect a change in the first cumulative image score to a second cumulative image score for an upcoming video segment to be captured using the first camera setting. The change may be detected based on a video buffer of the upcoming video segment of the video. The second cumulative image score may be less than the set image score threshold. The second cumulative image score may indicate a second quality level of the upcoming video segment that may be less than the first quality level. Alternatively stated, the second quality level, which is less than the first quality level and the set image score threshold may indicate that the quality level of the video may be degraded than the desired or required quality level for the upcoming video segment of the video when the upcoming video segment will be captured. The first image capture device 102 may be configured to capture a second video segment that corresponds to the upcoming video segment of the video using a second camera setting of the plurality of camera settings. The first image capture device 102 may capture the second video segment using the second camera setting to maintain the cumulative image score equal to or greater than the set image score threshold and at least the first quality level. In accordance with an embodiment, the first image capture device 102 may be configured to monitor the cumulative image score associated with different image frames of the first video segment captured using the first camera setting. The first image capture device 102 may be further configured to update the first camera setting to the second camera setting or other settings suited for video frames whenever the cumulative image score falls below the set image score threshold.

In accordance with an embodiment, instead of determination of the cumulative image score associated with each camera setting for an entire video frame of a video segment, the first image capture device 102 may determine the cumulative image score for certain user-selection regions or objects within a video frame (or image). The first image capture device 102 may be configured to receive a user input to select a plurality of region-of-interests (RoI) in the rendered preview on the display 104. The first image capture device 102 may be configured to set a different image score threshold for each of the plurality of region-of-interests. The set different image score thresholds may be at least one of a user-defined image score threshold in the preview mode or a default image score threshold value preset by a manufacturer of the first image capture device 102.

In accordance with an embodiment, the first image capture device 102 may be further configured to determine a RoI image score for each of the selected plurality of RoI. The first image capture device 102 may be configured to determine the RoI image score associated with each camera setting of the plurality of camera settings for a specified time in the preview mode of the first image capture device 102. The RoI image score associated with each camera setting of the plurality of camera settings may be determined based on the rendered preview of the scene 112 on the display 104. The first image capture device 102 may be further configured to capture the first video segment of the video that includes the selected plurality of RoI in the capture mode, using a first camera setting of the plurality of camera settings. The first camera setting may be associated with a first RoI image score that is equal to or greater than a set image score threshold for the first region-of-interest. In some embodiments, each RoI of the plurality of RoI in the first video segment may be captured by different camera settings of the plurality of camera settings if a single camera setting is not suited for all the plurality of RoI based on the determined RoI image score for each of the selected plurality of RoI.

In accordance with an embodiment, the first image capture device 102 may be further configured to track a position of each of the plurality of RoI, at the capture of the first video segment of the video. The first image capture device 102 may be configured to update the first setting used to capture the first video segment to the second setting based on a change in the tracked position of at least one RoI of the plurality of RoI. The first setting may be updated when the change in the tracked position further causes a change in the RoI image score for at least one RoI of the tracked plurality of RoI. The first image capture device 102 may be further configured to receive an input from the first user 110 to change the selection of the plurality of region-of-interests. For example, only one RoI may be selected while other selections may be discarded.

In accordance with an embodiment, it may be ascertained whether the first image capture device 102 is a stand-alone device or a part of a network of image capture devices configured to capture a same surrounding environment. In cases where the first image capture device 102 is a part of the network of image capture devices, the first image capture device 102 may be configured to communicate the first camera setting (i.e., the optimal camera setting) of the plurality of camera settings to a plurality of second image capture devices. In such a scenario, the cumulative image score determined for the first camera setting at the first image capture device 102 may be a maximum cumulative image score among the plurality of second image capture devices including the first image capture device 102. The plurality of second image capture devices may be synchronized with first image capture device 102 to collectively capture a 360° view (e.g., a 360° video) of a surrounding scene using the communicated first camera setting. The 360° view of the surrounding scene may include a surrounding environment around the first user 110.

In accordance with an embodiment, the processor 202 may be configured to store the maximum cumulative image score associated with the captured 360° video in the server 106. The processor 202 may be further configured to store information related to a location of the first image capture device 102 while capturing the video at a first time instant. Therefore, the first user 110 or a new user may utilize the stored maximum cumulative score and the location to re-capture a video at the same location at a second time instant, for example, another date or time in future. The processor 202 may retrieve the stored maximum cumulative image score from the server 106, based on common location coordinates.

In accordance with an embodiment, the first image capture device 102 may be configured to generate a quick response (QR) code that may include the determined cumulative image score for different video segments of the video. The QR code may further include the set image score threshold, information related to different camera settings used to capture the video, and a plurality of physical attributes of the first image capture device 102. The plurality of physical attributes may correspond to the device information of the first image capture device 102, such as model name, model number, manufacturer name, and the like. The first image capture device 102 may be configured to embed the generated QR code on at least an image of the video to preserve information associated with the capture of the video. The QR code generated on the image of the video may be utilized by other users to capture another video with the same camera setting and the same cumulative image score as that of the captured video.

Figure 2:
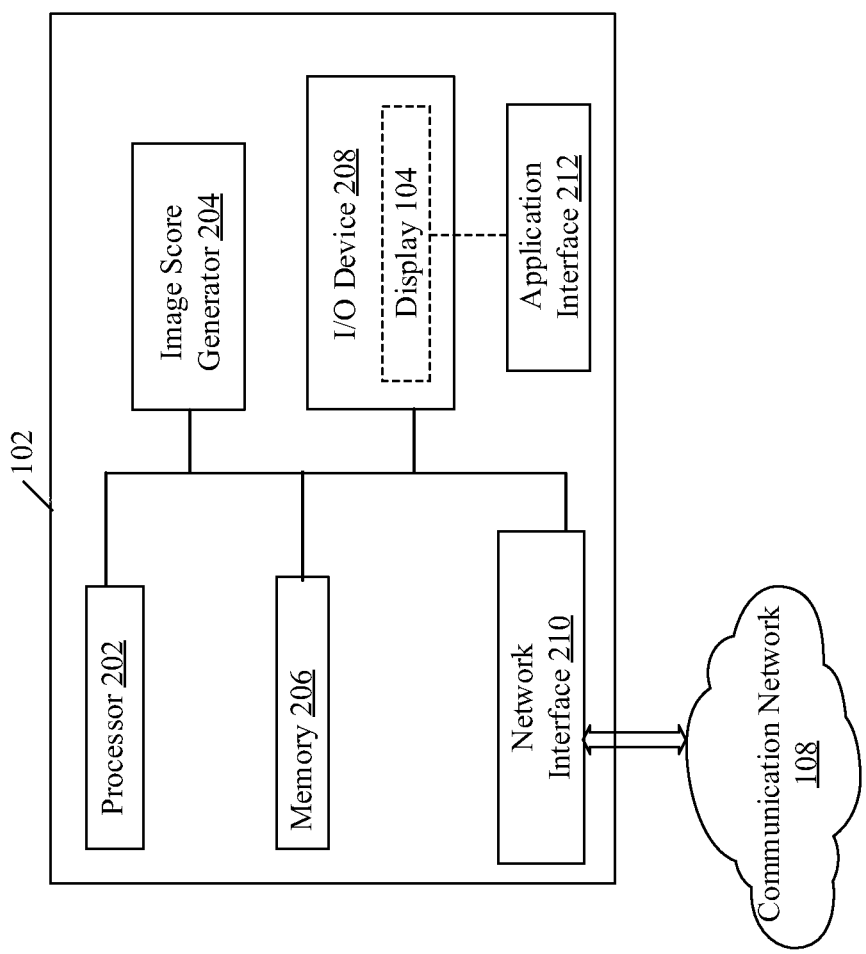
FIG. 2 is a block diagram that illustrates an exemplary first image capture device for the image score-based video quality enhancement, in accordance with an embodiment of the disclosure.

FIG. 2 is a block diagram that illustrates an exemplary first image capture device for the image score-based video quality enhancement, in accordance with an embodiment of the disclosure. FIG. 2 is explained in conjunction with elements from FIG. 1. With reference to FIG. 2, there is shown the first image capture device 102. The first image capture device 102 may include a processor 202, an image score generator 204, a memory 206, an input/output (I/O) device 208, and a network interface 210. The I/O device 208 may include the display 104, which may be utilized to render an application interface 212. The processor 202 may be communicatively coupled to the image score generator 204, the memory 206, and the I/O device 208. The processor 202 may be configured to communicate with the server 106, by use of the network interface 210.

The processor 202 may comprise suitable logic, circuitry, and interfaces that may be configured to execute instructions stored in the memory 206. The processor 202 may be configured to capture a preview of the scene 112. The processor 202 may be implemented based on a number of processor technologies known in the art. Examples of the processor 202 may be a Graphical Processing Unit (GPU), a Central Processing Unit (CPU), X86-based processor, a Reduced Instruction Set Computing (RISC) processor, an Application-Specific Integrated Circuit (ASIC) processor, a Complex Instruction Set Computing (CISC) processor, other processors, and the like.

The image score generator 204 may comprise suitable logic, circuitry, and interfaces that may be configured to determine a cumulative image score associated with each of the plurality of camera settings of the first image capture device 102. In accordance with an embodiment, the image score generator 204 may be configured to determine a RoI image score for a selected RoI. The image score generator 204 may be implemented based on a number of processor technologies known in the art. Examples of implementations of the image score generator 204 may be a Graphics Processing Unit (GPU), a Reduced Instruction Set Computing (RISC) processor, an Application-Specific Integrated Circuit (ASIC) processor, a microcontroller, a central processing unit (CPU), or other control circuits.

The memory 206 may comprise suitable logic, circuitry, and interfaces that may be configured to store the preview of the scene 112 that may include the plurality of preview images of the scene 112. The memory 206 may be further configured to store the cumulative image score associated with each of the plurality of camera settings of the first image capture device 102. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may comprise suitable logic, circuitry, and/or interfaces that may be configured to receive an input from a user, such as the first user 110, and provide an output to the first user 110 based on received input from the first user 110. For example, the I/O device 208 may be utilized to receive user-defined image score threshold from the first user 110. The I/O device 208 may include various input and output devices, which may be configured to communicate with the processor 202. Examples of the I/O device 208 may include, but are not limited to, a touch screen, a keyboard, a mouse, a joystick, a microphone, a display screen (for example, the display 104), and a speaker. In accordance with an embodiment, the I/O device 208 may include the display 104.

The network interface 210 may comprise suitable logic, circuitry, and/or interfaces that may be configured to facilitate communication between the first image capture device 102 and the server 106, via the communication network 108. The network interface 210 may be implemented by use of various known technologies to support wired or wireless communication of the first image capture device 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols, and technologies. Examples of the plurality of communication standards, protocols and technologies include, but are not limited to, Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 212 may correspond to a user interface (UI) rendered on a display, such as the display 104. The application interface 212 may display the preview of the scene 112 to the first user 110. The application interface 212 may be further configured to display the captured video of the scene 112 to the first user 110. An example of the application interface 212 may include, but is not limited to, a graphical user interface (GUI). In some embodiments, the display 104 may be an internal display screen integrated with the first image capture device 102.

The functions or operations executed by the first image capture device 102, as described in FIG. 1, may be performed by the processor 202 and the image score generator 204. The operations executed by the processor 202 and the image score generator 204 are further described, for example, in the FIGS. 3A, 3B, 4, 5, 6, 7A, and 7B.

Figure 3A:
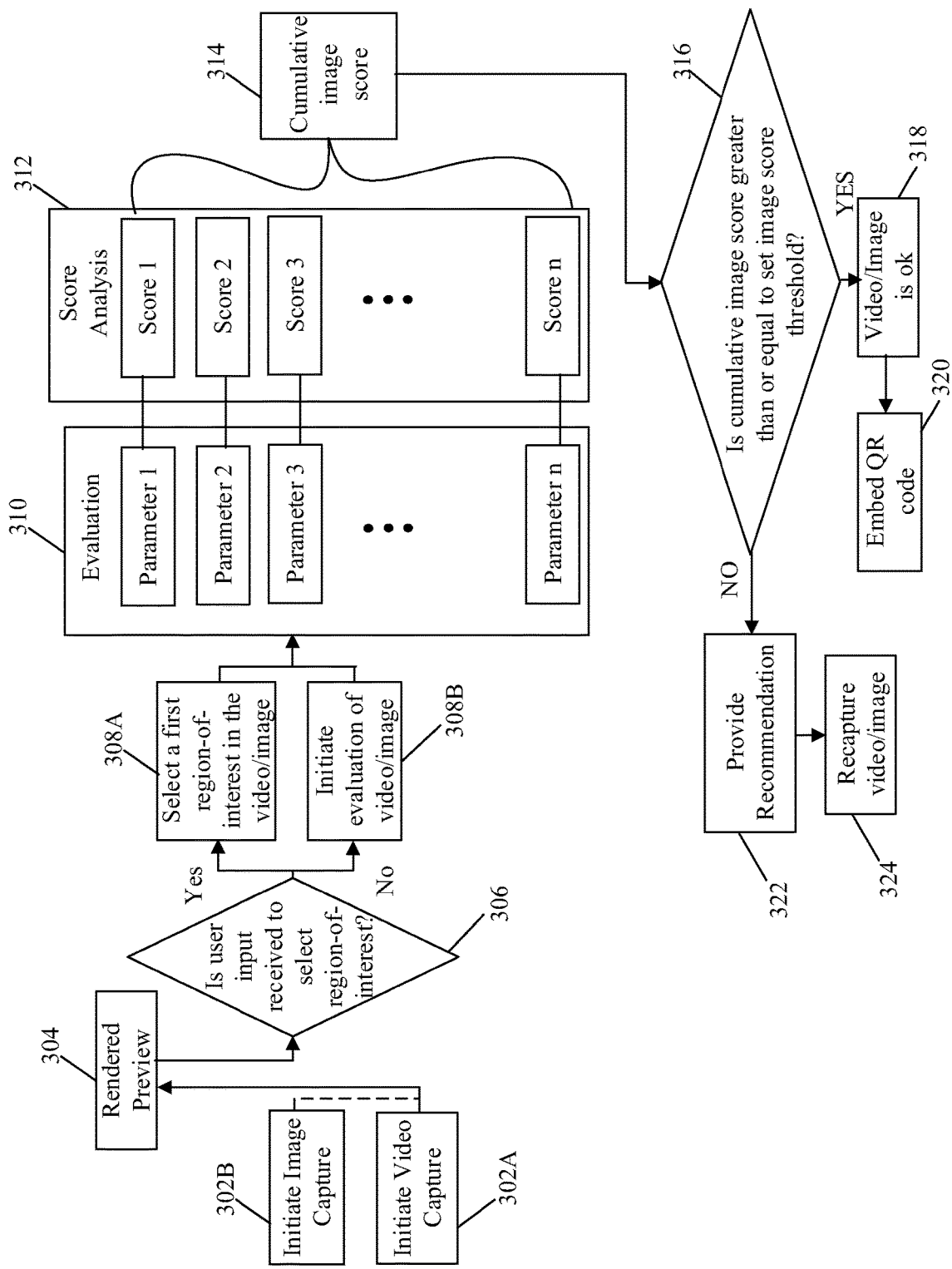
FIG. 3A illustrates a processing pipeline that depicts the exemplary operations for image score-based video quality enhancement, in accordance with an embodiment of the disclosure.

FIG. 3A illustrates a processing pipeline that depicts the exemplary operations for image score-based video quality enhancement, in accordance with an embodiment of the disclosure. FIG. 3A is explained in conjunction with elements from FIG. 1 and FIG. 2. With reference to FIG. 3A, there is shown a processing pipeline 300A that depicts exemplary operations for image score-based video quality enhancement. At 302A, the first image capture device 102 may be configured to initiate a video capture of the scene 112. In accordance with an embodiment, at 302B, the first image capture device 102 may be configured to initiate an image capture of the scene 112 instead of the video capture. At 304, the display 104 may be configured to render a preview of the scene 112. In accordance with an embodiment, at 304, the display 104 may be configured to display the rendered preview of a video.

At 306, the processor 202 may be configured to determine whether a user-input is received to select a RoI. A user, such as the first user 110, may provide an input to the first image capture device 102 to select a RoI from the plurality of RoIs. At 308A, in a first scenario, the processor 202 may be configured to select a first RoI in the rendered preview of the scene 112 on the display 104. The processor 202 may be further configured to initiate the evaluation of the selected first RoI in the preview of the scene 112. At 308B, in a second scenario, when the processor 202 does not receive an input to select the RoI, the processor 202 may be configured to initiate evaluation of the video to be captured (or the image to be captured) in the rendered preview in a preview mode (i.e., or during runtime). The processor 202 may initiate the evaluation of the entire video or entire image (instead of only the selected first RoI at 308A).

At 310, the processor 202 may be configured to evaluate the video or the image based on the evaluation of the plurality of camera parameters of the first image capture device 102. The plurality of camera parameters may include "Parameter 1, 2, 3, . . . , n". For example, the plurality of camera parameters may correspond to, but not limited to, to an exposure value, a sharpness value, a shutter speed value, and a camera ISO value. The processor 202 may be configured to evaluate the plurality of camera parameters based on a value of each of the plurality of camera parameters.

At 312, the image score generator 204 may be configured to determine a score for each camera parameter of the plurality of camera parameters, such as the "Parameter 1, 2, 3, . . . , n". The score for each camera parameter of the plurality of camera parameters may be determined based on an analysis of the value of each camera parameter of the plurality of camera parameters with respect to the field-of-view (i.e., the rendered preview of the scene 112) in the preview mode. The determined score for each camera parameter may be utilized to analyze the quality video or the image in the rendered preview or during runtime (i.e., real time or near real time) of the first image capture device 102. The processor 202 may be configured to analyze the determined score of each camera parameter to evaluate the video or the image. For example, the processor 202 may determine "Score=8" for the "Parameter 1", "Score=3" for "Parameter 2", "Score=9" for "Parameter 3", and similarly "Score=8" for "Parameter n". Different combinations of the value of each camera parameter of the plurality of camera parameters may form the plurality of camera settings of the first image capture device 102.

At 314, the image score generator 204 may be configured to determine a cumulative image score associated with each camera setting of the plurality of camera settings for a specified time period, based on the rendered preview before actual capture of video (or image). The cumulative image score of the rendered preview may be determined based on individual scores of the plurality of camera parameters. In some embodiments, the image score generator 204 may be configured to train and utilize a no-reference quality assessment model to analyze a quality level and determine the cumulative image score of the rendered preview. An algorithm such as, a Natural Image Quality Evaluator (NIQE), a Blind Image Spatial Quality Evaluator (BRISQUE), and the like, may be utilized to train the no-reference quality assessment model. The NIQE algorithm and the BRISQUE algorithm may use identical predictable statistical features, also referred to as natural scene statistics (NSS). The NSS may be useful for determining a quality level of the rendered preview (a video preview). The NSS may be based on normalized luminance coefficients in a spatial domain and may be modeled as a multi-dimensional Gaussian distribution. Thus, the image score generator 204 may not utilize a reference image for evaluation of the quality level of the rendered preview using the NIQE and/or the BRISQUE technique. In accordance with an embodiment, the cumulative image score may correspond to the RoI image score that may be determined for the selected first RoI (not entire video frame or image) selected by the first user 110 (in case of RoI selection).

At 316, the processor 202 may be configured to determine whether the cumulative image score is greater than the set image score threshold. The set image score threshold may be a user-defined image score threshold. In accordance with an embodiment, the set image score threshold may be a default image score threshold value preset by the manufacturer of the first image capture device 102. In an instance, when the determined cumulative image score is greater than or equal to the set image score threshold, (for example "8"), the control may pass to 318. In another instance, when the determined cumulative image score is less than the set image score threshold, the control may pass to 322.

At 318, when the cumulative image score is greater than or equal to the set image score threshold, the quality level of the rendered preview of the scene 112 may be considered as acceptable ("OK"). Therefore, the processor 202 may be configured to initiate actual capture of the video (or image) in the case when the cumulative image score is determined to be greater than or equal to the set image score threshold for the rendered preview of the scene 112. In accordance with another embodiment, the processor may be configured to provide an output to the first user 110 that the captured video or image during runtime is of desired quality level as set by the first user 110.

At 320, the processor may be configured to generate a quick response (QR) code that may include the determined cumulative image score for different video segments of the video (or the captured image) and the set image score threshold. The QR code may further include information related to different camera settings used to capture the video or the image and a plurality of physical attributes of the first image capture device 102. The processor 202 may be configured to embed the generated QR code on at least an image frame of the captured video (or the captured image) to preserve information associated with the capture of the video (or the image). The QR code may be utilized by other users to retrieve information about the cumulative image score of the video or the image and information related to different camera settings used to capture the video (or the image). Thus, a new video or a new image may be captured using the camera settings obtained from the QR code to achieve the cumulative image score equal to the embedded QR code.

At 322, when the cumulative image score is less than the set image score threshold, the processor 202 may be configured to provide recommendation to the first user 110 to select from a specified number of newly generated camera settings along with predicted results for each newly generated settings different from previously stored settings in the memory 206. The recommendation may be provided so as to achieve the cumulative image score that may be greater than or equal to the set image score threshold. At 324, the processor 202 may then capture the video or the image of the scene 112. The processor 202 may be configured to capture the video or the image based on a modified camera setting of the first image capture device 102 that may be modified based on a change in values of the one or more camera parameters of the plurality of camera parameters.

Figure 3B:
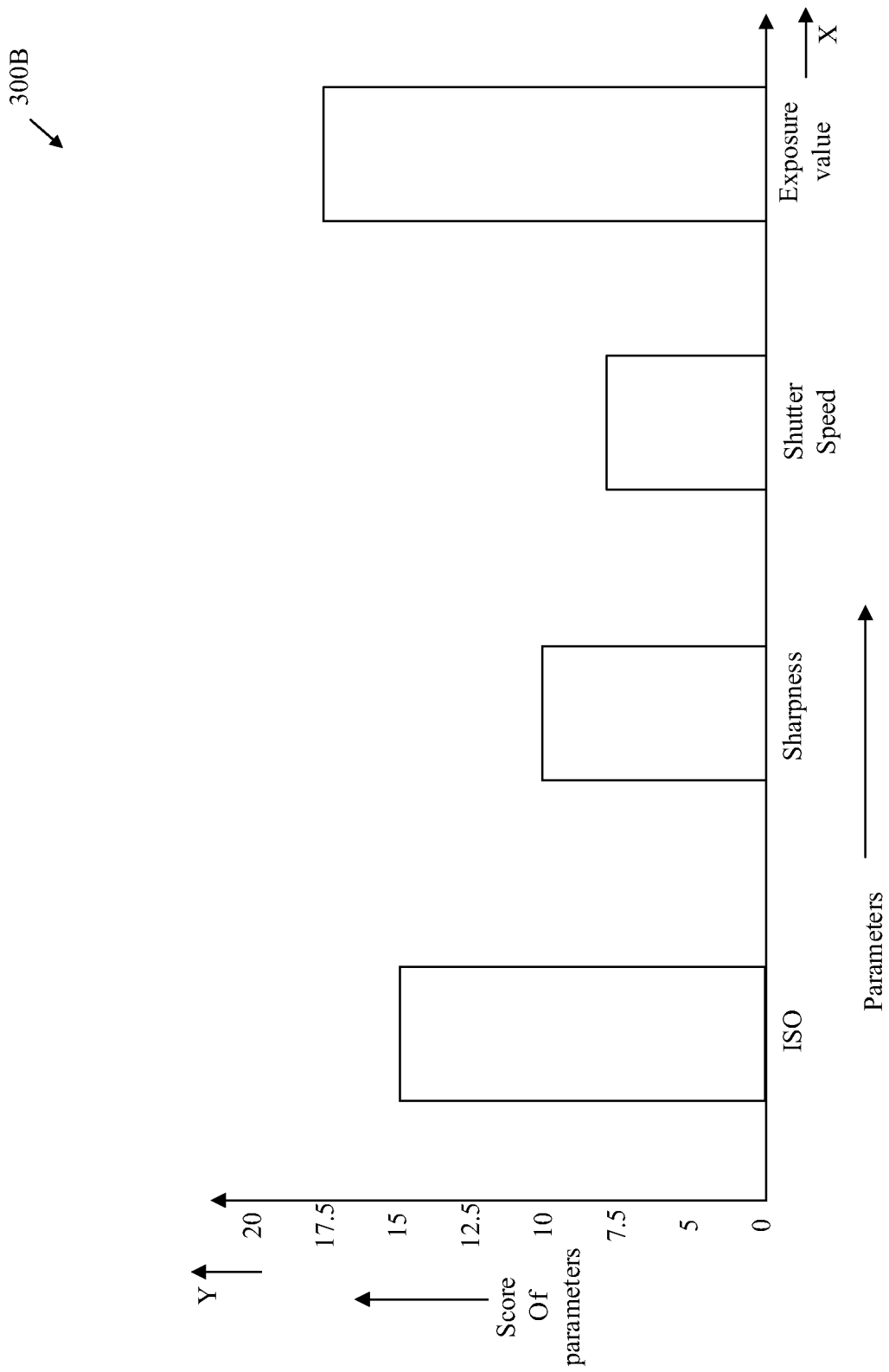
FIG. 3B illustrates a score analysis graph for analysis of the score of a plurality of camera parameters, in accordance with an embodiment of the disclosure.

FIG. 3B illustrates an exemplary score analysis graph for analysis of the score of the plurality of camera parameters, in accordance with an embodiment of the disclosure. FIG. 3B is explained in conjunction with elements from FIG. 1, FIG. 2 and FIG. 3A. With reference to FIG. 3B, there is shown a score analysis graph 300B. The score analysis graph 300B includes a plurality of camera parameters on X-axis and a score of each of the plurality of parameters on Y-axis. The score analysis graph 300B depicts the determined score of the plurality of camera parameters. For example, the plurality of camera parameters may correspond to, but not limited to, the camera ISO value, the sharpness value, the shutter speed value, and the exposure value.

In accordance with an embodiment, the image score generator 204 may be configured to determine a score for the camera ISO value of the first image capture device 102. The camera ISO value may be a measure of sensitivity of an image sensor of the first image capture device 102 towards light. When the camera ISO value is low, the image sensor of the first image capture device 102 may be less sensitive towards light, as compared to when the camera ISO value is high. When the ISO value is high, the image sensor may be more sensitive to light as compared to the low ISO value, and the first image capture device 102 may be able capture images even in dark or low lighting conditions. The camera ISO value may correspond to a brightness value of the video captured by the first image capture device 102. The image score generator 204 may be configured to determine the score for the camera ISO value based on an illumination index value. The image score generator 204 may be configured to estimate the illumination index value based on a Gaussian distribution of a Hue, Saturation, and Value (HSV) histogram. The HSV histogram may be a color histogram that represents a distribution of colors in an image, based on an HSV kind of color space, i.e., HSV. HSV (Hue, Saturation, and Value) may be an alternative representation of a Red, Green, Blue (RGB) color model that may represent a way with which human vision perceives color-making attributes, such as hue, saturation, and value. The illumination index value may be a measure of a brightness level of the video captured by the first image capture device 102. The illumination index value may be estimated, for example, by equation (1) as shown below:

$$\xi(G_{im}, G_d) = \text{sign}(\sigma_{im} - 41.0003)\left(\text{sign}(\mu_{im} - 128)\frac{\kappa(G_{im}, G_d)}{2\kappa_{max}} + 0.5\right) \quad (1)$$

where, $\xi$ represents the illumination index;
$\sigma$ represents standard deviation;
G represents Gaussian distribution;
$\mu$ represents Mean; and
$\kappa$ represents divergence value.

In accordance with an embodiment, the value of the illumination index may vary from "−1" to "1". In an instance, when the value of the illumination index lies in a range of "−1 to −0.5" and "0.5 to 1", the captured video may be considered as bright. In another instance, when the value of the illumination index lies in a range of "−0.5 to 0.5", the captured video may be considered as dark or near dark. In accordance with an embodiment, the image score generator 204 may be further configured to determine a score for a sharpness value that may be one of the plurality of camera parameters. The sharpness value may correspond to an edge contrast of a plurality of pixels of an image. The image score generator 204 may be configured to estimate the sharpness value of each image frame of the captured video based on a Laplacian variance that may be calculated for each pixel of a plurality of pixels of each image frame of the captured video. The calculated Laplacian variance may depict a clarity of edges of each pixel of the plurality of pixels. In accordance with an embodiment, on a scale ranging from 0 to 10, for example, if the Laplacian variance is estimated to be above a defined threshold value, the image frames of the video may be considered to be sharp. Therefore, in such case, the image score generator 204 may be configured to determine a high score for the sharpness value. In another embodiment, on the scale ranging from 0 to 10, for example, if the Laplacian variance is estimated to be below the defined threshold value, the image frames of the video are considered to be blur. Therefore, in such case, the image score generator 204 may be configured to determine a low score for the sharpness value.

In accordance with an embodiment, the image score generator 204 may be further configured to determine a score for a shutter speed value that may be one of the plurality of camera parameters. The shutter speed value may be a time period for which the first image capture device 102 may be exposed to light while capturing the video of the scene 112. The shutter speed value may be directly related to the sharpness of the video. For example, if a moving object is captured with a low shutter speed value, the capture video or image may be blur. The image score generator 204 may be configured to determine a high score, for example, greater than a set threshold score, for the shutter speed value when the shutter speed value of the first image capture device 102 is high, that is, the first image capture device 102 may be exposed to light for a long time period.

In accordance with an embodiment, the image score generator 204 may be further configured to determine a score for an exposure value that may be one of the plurality of camera parameters. The image score generator 204 may be configured to estimate the exposure value based on an aperture value, an exposure time value, and the camera ISO value of the first image capture device 102. The image score generator 204 may be configured to estimate the exposure value, for example, by equation (2) as shown below:

$$EV = \log_2\left(\frac{100 * Aperture^2}{ISO * \text{Exposure Time}}\right) \quad (2)$$

where, EV represents Exposure Value; and
ISO represents the camera ISO value;

The image score generator 204 may be configured to determine the score of the exposure value based on the estimated exposure value. The score analysis graph 300B may be utilized to analyze the score of the plurality of camera parameters, in comparison with each other. The first user 110 may analyze the score of the plurality of camera parameters and modify the value of a camera parameter, if the determined score of the camera parameter is low as compared to other camera parameters. The score analysis graph 300B may also provide an insight to the first user 110 to improve the photography skills. The first user 110 may improve the photography skills based on modification of the values of the plurality of camera parameters to achieve the cumulative image score of the captured video or image above the set image score threshold.

Figure 4:
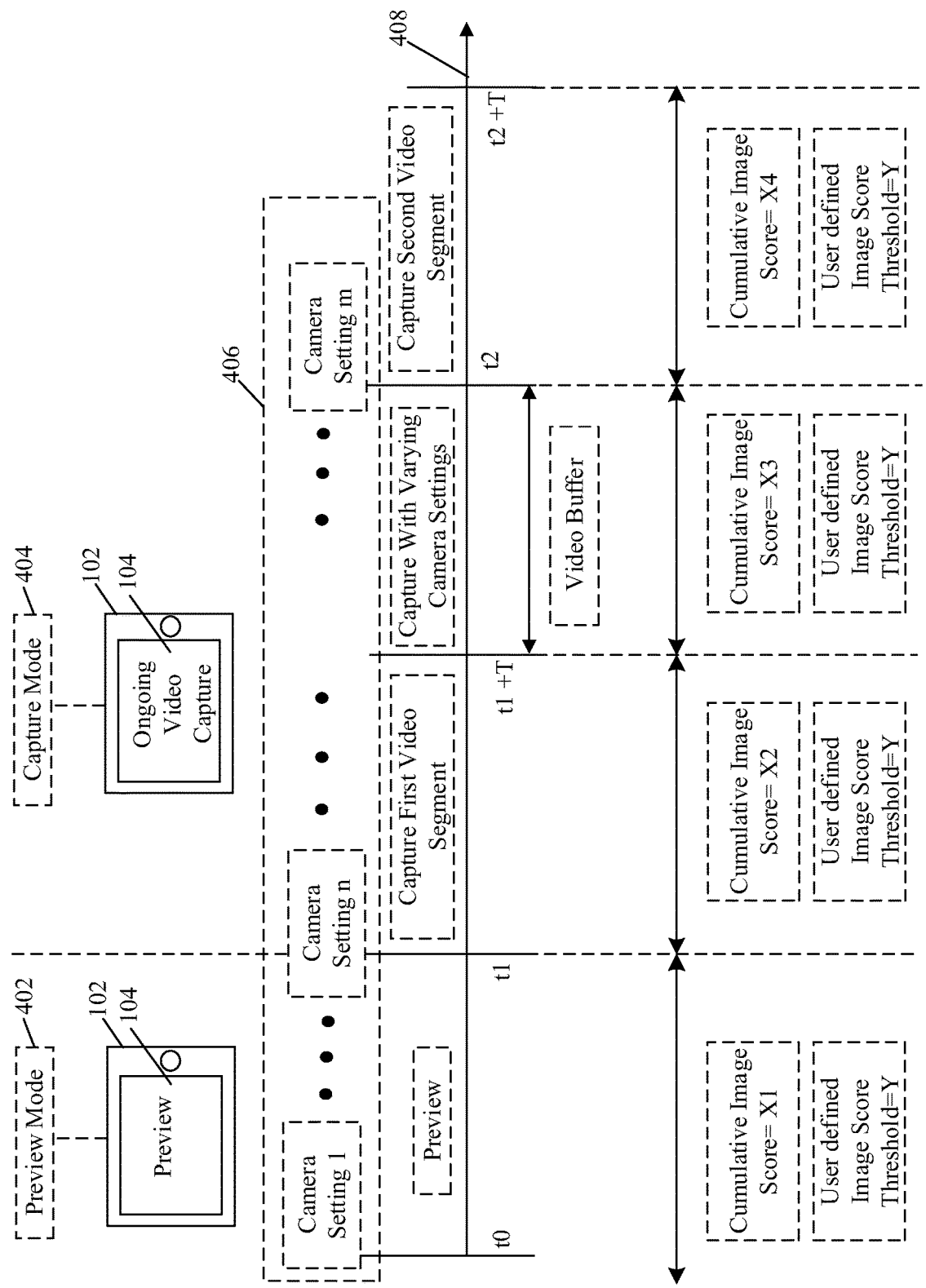
FIG. 4 illustrates an adaptive video capture based on a change in cumulative image scores during capture of the video, in accordance with an embodiment of the disclosure.

FIG. 4 illustrates an adaptive video capture based on a change in cumulative image scores during capture of the video, in accordance with an embodiment of the disclosure. FIG. 4 is explained in conjunction with elements from FIG. 1, FIG. 2, FIG. 3A and FIG. 3B. With reference to FIG. 4, there is shown the first image capture device 102 in a preview mode 402 for a first time period (e.g., "t0" to "t1") and a capture mode 404 for a subsequent second time period (e.g., "t1" to "t1+T" and "t2" to "t2+T"). There is further shown a plurality of camera settings 406 and a timeline 408 that depicts the adaptive video capture that dynamically adapts and selects different camera settings for video capture if a change in the cumulative image score during a video capture by the first image capture device 102, is determined. The timeline 408 may include a plurality of time intervals during the capture of the video by the first image capture device 102. The plurality of camera settings 406 may be different combination of the plurality of camera parameters. Examples of the plurality of camera parameters may include, but are not limited to, the sharpness value, the shutter speed value, the exposure value, the camera ISO value. Alternatively stated, each camera setting may be achieved based on a combination of values of the plurality of camera parameters.

In accordance with an embodiment, at a time instant "$t_0$" the first image capture device 102 may be configured to capture a preview of the scene 112. The display 104 may be configured to render the preview of the scene 112. The image score generator 204 may be configured to determine the cumulative image score associated with each camera setting of the plurality of camera settings of the first image capture device 102. The image score generator 204 may be configured to continuously determine the cumulative image score by using different camera settings of the plurality of camera settings during the time period. The image score generator 204 may be configured to determine a cumulative image score associated with a "camera setting 1" and may continue to determine the cumulative image score associated with other camera settings of the plurality of settings until a time instant "$t_1$" is reached where different camera settings are tested and evaluated. During the time interval "$t_0$-$t_1$", the cumulative image score "X1" for the rendered preview may be less than a user-defined image score threshold "Y". The user-defined image score threshold "Y" may correspond to the set image score threshold, which may be defined by the first user 110. For example, the cumulative image score "X1" for the rendered preview may be "5.5" and the user-defined image score threshold "Y" may be "8", during the time interval "$t_0$-$t_1$", in the preview mode 402 of the first image capture device 102. In some embodiments, in the preview mode 402, the cumulative image score "X1" is always less than the user-defined image score threshold "Y" during the time interval "$t_0$-$t_1$".

At the time instant "$t_1$" the processor 202 may be configured to start capturing the first video segment of the video of the scene 112, using a camera setting "n", for example, a camera setting 5. The camera setting 5 may correspond to the first camera setting of the plurality of camera settings 406, at which the processor 202 may be configured to capture the first video segment of the video in the capture mode 404 of the first image capture device 102. At the time instant "$t_1$", the cumulative image score "X2" associated with the camera setting 5, may be greater than or equal to the user-defined image score threshold "Y". For example, the cumulative image score "X2" associated with the camera setting 5 may be "8.5", at the time instant "$t_1$" and the user-defined image score threshold "Y" may be "8". The cumulative image score "X2" during the capture of the first video segment may correspond to the first cumulative image score. The cumulative image score "X2" corresponding to the first cumulative image score may indicate a first quality level of the captured first video segment. The first quality level may be equal to or better than a threshold quality level corresponding to the set image score threshold. The processor 202 may then start actual capture of the first video segment of the scene 112 in the capture mode 404 using the "camera setting 5" that corresponds to the first camera setting.

In accordance with an embodiment, the image score generator 204 may be configured to check the cumulative image score of the ongoing video capture of the first video segment of scene 112. At a time instant "$t_1$+T", when the image score generator 204 may detect that the cumulative image score of the ongoing video capture of the first video segment, may be less than the user-defined image score threshold "Y". For example, the cumulative image score "X3" may be "7", at the time instant "$t_1$+T" and the user-defined image score threshold "Y" may be "8". The cumulative image score "X3" may correspond to the second cumulative image score. The cumulative image score "X3" corresponding to the second image score threshold may indicate a second quality level that may be less than the first quality level and the threshold quality level. The processor 202 may be configured to detect a change in the first cumulative image score (also represented as cumulative image score "X2") to the second cumulative image score (also represented as cumulative image score "X3") for an upcoming video segment to be captured. The change may be detected based on a video buffer of the upcoming video segment of the video. The processor 202 may then temporally halt actual video capture (acquisition and permanent video storage) and automatically initiate analysis of video buffer (from "$t_1+T$" to "t2") of the upcoming video segment with varying camera settings during the ongoing video capture in the capture mode 404. In some embodiments, the processor 202 may not temporally halt actual video capture from "$t_1+T$" to "t2", but proactively manage the video capture so that before the first cumulative image score starts falling below so as to reach near user-defined image score threshold "Y", such analysis of video buffer may be triggered and corrective action to switch to different camera setting suited for the next time instant, may be executed.

At a time instant "$t_2$", the processor 202 may be configured to continue capture a second video segment of the video in the capture mode 404 of the first image capture device 102. The second video segment may correspond to the upcoming video segment of the video. The processor 202 may be configured to capture the second video segment using a camera setting "m", at which the determined cumulative image score "X4" may be greater than or equal to the user-defined image score threshold "Y". For example, the processor 202 may use the "camera setting 15" to capture the second video segment, and the cumulative image score "X4" at the time instant "$t_2$" may be "9" and the user-defined image score threshold "Y" may be "8". The camera setting "m" may correspond to the second camera setting. The processor 202 may be configured to continue the capture the of the video and check the cumulative image score and maintain the value of the cumulative image score greater than or equal to the user-defined image score threshold. The processor 202 may be further configured to maintain the quality level of the video in the capture mode 404 above the threshold quality level and the first quality level.

Figure 5:
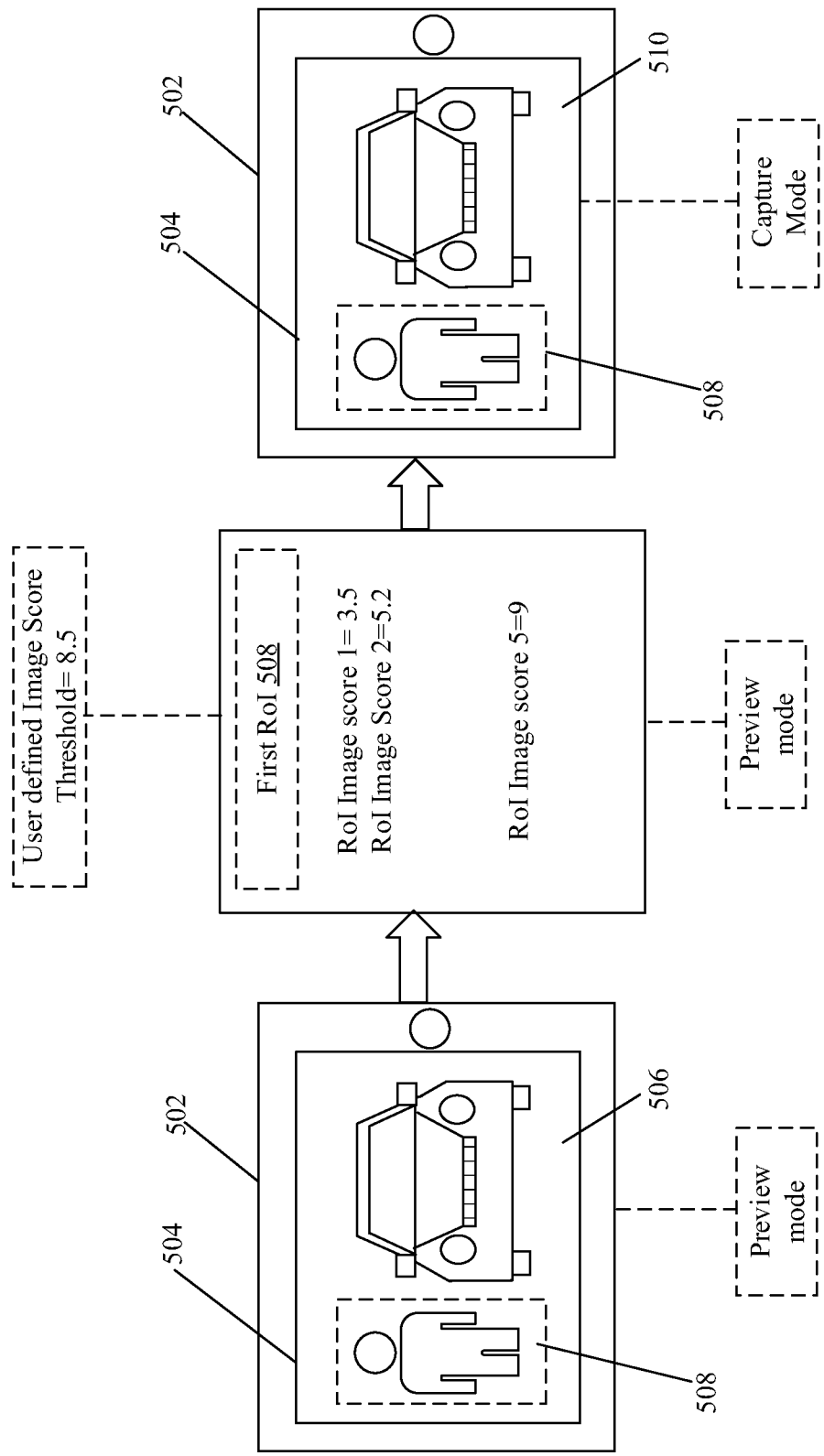
FIG. 5 illustrates a scenario for selection of a region-of-interest in a preview mode of an exemplary first image capture device, in accordance with an embodiment of the disclosure.

FIG. 5 illustrates an exemplary scenario for selection of a RoI in a preview mode of an exemplary image capture device, in accordance with an embodiment of the disclosure. FIG. 5 is explained in conjunction with elements from FIG. 1, FIG. 2, FIG. 3A, FIG. 3B and FIG. 4. With reference to FIG. 5, there is shown a smartphone 502, a display screen 504 of the smartphone 502, a preview 506, a first RoI 508, and a video 510. The display screen 504 may render the preview 506 of a scene, such as the scene 112 (FIG. 1), in a preview mode of an in-built camera of the smartphone 502. The smartphone 502 may correspond to the first image capture device 102 and may include the processor 202. The processor 202 may be configured to provide an option to a user, such the first user 110 (as shown in FIG. 1), to select a RoI, such as the first RoI 508, in the preview 506 of the scene 112. The first user 110 may provide an input to the smartphone 502 to select the first RoI 508 in the preview 506 of the scene 112. In accordance with an embodiment, if the first user 110 does not provide the input to the smartphone 502 to select the first RoI 508, then the processor 202 may be configured to initiate the evaluation of the entire preview 506 of the scene 112 in the preview mode of the smartphone 502.

In accordance with an embodiment, the processor 202 may be configured to select the first RoI 508 from a plurality of RoIs in the preview 506 of the scene 112, based on the received user input. The processor 202 may be configured to determine a set of (X, Y)-coordinates of the selected first RoI 508. The processor 202 may be configured to set the image score threshold based on a user selection by the first user 110. The set image score threshold may be a user-defined image score threshold. For example, as shown in FIG. 5, the user-defined image score threshold may be "8.5". The image score generator 204 may be configured to determine a RoI image score for selected first RoI 508 using different camera settings in the preview 506 of the scene 112. For example, the RoI image score 1 may be equal to "3.5", that is less than the user-defined image score threshold. The RoI image score 1 may correspond to the first RoI image score for the first RoI 508. The RoI image score 1 may be associated with a first camera setting of the smartphone 502 of the plurality of camera settings of the smartphone 502. The processor 202 may be configured to modify the first camera setting of the smartphone 502 based on the change in values of the plurality of camera parameters. The image score generator 204 may be configured to determine a RoI image score 2 for the selected first RoI 508 based on a second camera setting of the plurality of camera settings. For example, the RoI image score 2 may be equal to "5.2", that is less than the user-defined image score threshold. The processor 202 may be configured to modify the camera setting of the smartphone 502 based on the change in values of the plurality of camera parameters, continuously until the RoI image score is greater than or equal to the user-defined image score threshold. For example, the image score generator 204 may be configured to determine a RoI image score 5, associated with a fifth camera setting, for the first RoI 508 in the preview 506. The RoI image score 5 may be equal to "9", that is greater than the user-defined image score threshold.

In accordance with an embodiment, the processor 202 may be configured to start the capture of the video 510 of the scene 112 using the fifth camera setting, associated with the RoI image score 5 that is greater than the user-defined image score threshold, in the capture mode of smartphone 502. The processor 202 may be configured to track the position of the first RoI 508 in the video 510 during capture of the scene 112. In accordance with an embodiment, the processor 202 may be configured to change the camera setting, (for example, the fifth camera setting) used to capture the video, based on a change in the tracked position of the first RoI 508. The camera setting used for capturing the video 510 may be updated when the change in the tracked position of the first RoI causes a change in the cumulative image score for the first RoI 508 of the video 510 during the capture mode of the smartphone 502. The processor 202 may also provide an option to change the selection from the first RoI 508 to a second RoI during the capture of the video 510. In accordance with an embodiment, the first user 110 may select the second RoI when the first RoI may be no longer in the frame of the video 510 during the capture mode of the smartphone 502. Similar to the adaptive video capture based on cumulative image scores, as shown and described in FIG. 4, the RoI image scores for selected RoIs of the plurality of RoIs may be used for adaptive capture of a plurality of video segments of the video 510 by the smartphone 502.

Figure 6:
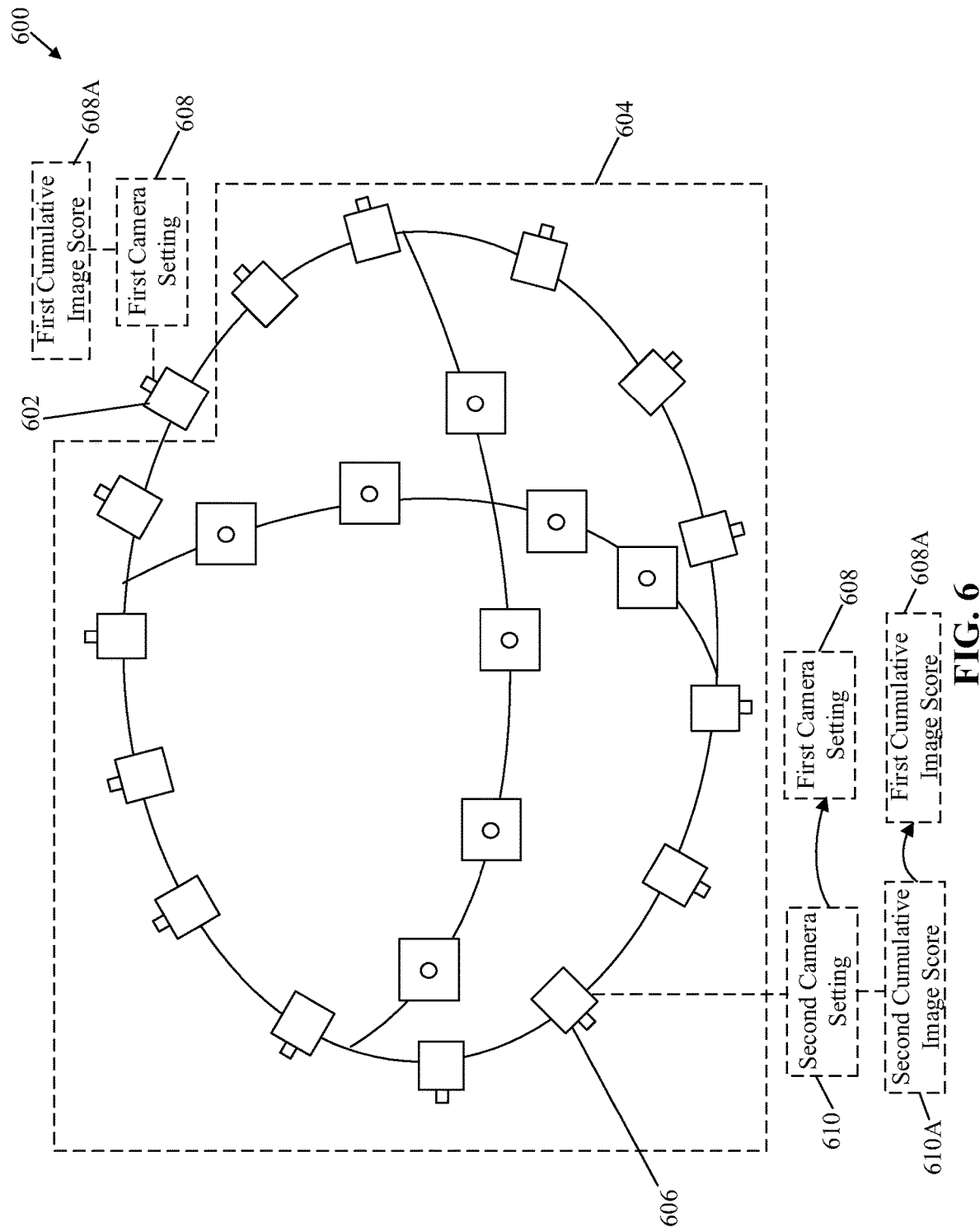
FIG. 6 illustrates a network of cameras that captures a 360° view of a scene based on image scores, in accordance with an embodiment of the disclosure.

FIG. 6 illustrates a network of cameras that captures a 360° view of a scene, in accordance with an embodiment of the disclosure. FIG. 6 may be explained in conjunction with elements from FIG. 1, FIG. 2, FIG. 3A, FIG. 3B, FIG. 4 and FIG. 5. With reference to FIG. 6 there is shown a network of cameras 600. The network of cameras 600 may include a first camera 602. The first camera 602 may correspond to the first image capture device 102. The network of cameras 600 may further include a plurality of second cameras 604. The plurality of second cameras 604 may correspond to the plurality of second image capture devices. There is further shown a first camera setting 608, a first cumulative image score 608A, a second camera setting 610, a second cumulative image score 610A. The first camera 602 may be associated with the first camera setting 608 and the first cumulative image score 608A. A camera 606 of the plurality of second cameras 604 may be associated with the second camera setting 610 and the second cumulative image score 610A. The components and operations of the plurality of second cameras may be same as that of the first camera 602. In accordance with an embodiment, the network of cameras 600 may be configured to collectively capture the 360° view of a scene.

In accordance with an embodiment, the first camera 602 may be communicatively coupled to the plurality of second cameras 604. The first camera 602 may be synchronized with the plurality of second cameras 604 to capture a 360° preview of the scene. The first camera 602 may be configured to capture a first portion of the 360° preview of the scene using the first camera setting 608 of the plurality of camera settings. Similarly, the plurality of second cameras 604 may be configured to capture different portions of the 360° preview of the scene. The first camera 602 may be configured to determine the first cumulative image score 608A associated with the first camera setting 608. Similarly, the plurality of second cameras 604 may be configured to determine a plurality of cumulative image scores associated with a plurality of camera settings of the plurality of second cameras 604, based on the capture of the 360° preview of the scene. For example, the camera 606 of the plurality of second cameras 604 may be configured to determine the second cumulative image score 610A associated with the second camera setting 610 of the camera 606.

In accordance with an embodiment, each camera may communicate the determined cumulative image score with other cameras of the network of cameras 600. Based on a comparative analysis of the plurality of cumulative image scores for each camera in the network of cameras 600, it may be detected that the first camera 602 have the maximum cumulative image score. Additionally, the detected maximum cumulative image score may be greater than or equal to the set image score threshold that may be a user-defined image score threshold. In accordance with embodiment, the set image score threshold may be a default image score threshold value preset by a manufacturer of the network of cameras 600. In accordance with an embodiment, the network of cameras 600 may be communicatively coupled to an external processor (not shown) configured to detect the maximum cumulative image score. The first camera 602 may be configured to communicate the first camera setting 608 associated with the first cumulative image score 608A (that is detected as the maximum cumulative image score for the first camera setting 608) to the plurality of second cameras 604.

In a first scenario, when the first cumulative image score 608A is detected as the maximum cumulative image score, then the plurality of second cameras 604 may be configured to modify its current camera settings to be set as the first camera setting 608. For example, the camera 606 may be configured to modify the second camera setting 610 to the first camera setting 608 based on change in values of the plurality of camera parameters of the camera 606. Therefore, the second cumulative image score 610A may be modified to the first cumulative image score 608A that is the maximum cumulative image score, based on the modification in camera settings. The first camera 602 may be synchronized with the plurality of second cameras 604 to collectively capture a video or image of the 360° view of the scene using the communicated first camera setting 608. The communicated first camera setting 608 used to capture the video or image of the 360° view of the scene may be associated with the first cumulative image score 608A that is the maximum cumulative image score. Additionally, the first camera 602 may be configured to communicate a viewing angle associated with the capture of the 360° view from at least one plane to the first user 110.

In a second scenario, when the first camera 602 may be configured to detect a cumulative image score of one of the camera of the plurality of second cameras 604, as the maximum cumulative image score, for example, the second cumulative image score 610A of the camera 606 is detected as the maximum cumulative image score, then the first camera 602 and the plurality of second cameras 604 may be configured to modify the first camera setting 608 to the second camera setting 610. In such a case, the camera 606 may be configured to communicate the second camera setting 610 to the first camera 602 and other cameras in the network of cameras 600. The first camera 602 may be synchronized with the plurality of second cameras 604 to collectively capture the video or image of the 360° view of the scene using the communicated second camera setting 610. Similar to the adaptive video capture based on cumulative image as shown and described, for example, in FIG. 4, the network of cameras 600 may also capture 360° video adaptively based on the image scores.

In accordance with another embodiment, the network of cameras 600 that includes the first camera 602 and the plurality of second cameras 604 may be synchronized to capture the video or image of the 360° view of the scene. Each camera of the first camera 602 and the plurality of second cameras 604 may be configured to capture the video or image of the 360° view of the scene using a different camera setting of the plurality of camera settings. In such a case, the first camera 602 and the plurality of second cameras 604 may be unable to communicate the plurality of camera settings used during capture of the preview of the 360° view of the scene. The first camera 602 may be configured to detect the maximum cumulative image score associated with a camera setting of at least one camera from the first camera 602 or the plurality of second cameras 604, based on an evaluation of the captured video in a post-processing stage. In the post-processing stage, the 360° video of the scene may be already captured. The captured 360° video may comprise a plurality of images that may be captured by the first camera 602 and the plurality of second cameras 604. The first camera 602 may be configured to determine an image of the plurality of images of the captured video that may be associated with the maximum cumulative image score. The first camera 602 may be further configured to determine the camera setting used to capture the image of the plurality of images associated with the maximum cumulative image score by the first camera 602 and the plurality of second cameras 604. The first camera 602 may be configured to apply the camera setting associated with the detected maximum cumulative image score to the plurality of other images captured from the first camera 602 and the plurality of second cameras 604 in the post-processing stage.

The first camera 602 may be configured to apply a plurality of techniques to transform the plurality of images captured by the first camera 602 and the plurality of second cameras 604 to maintain the cumulative image score of the plurality of images equal to the maximum cumulative image score. Examples of the plurality of techniques may include, but are not limited to, exposure correction, dynamic range correction, luminosity correction, white balancing, edge-preserving smoothing and de-noising and various other filters used for image correction. The first camera 602 may be configured to generate a new video based on a stitch operation of the plurality of images in an equi-rectangular format in the post-processing stage. The equi-rectangular format may be image projection technique used for displaying a flat image for the 360° view of a scene.

Figure 7A:
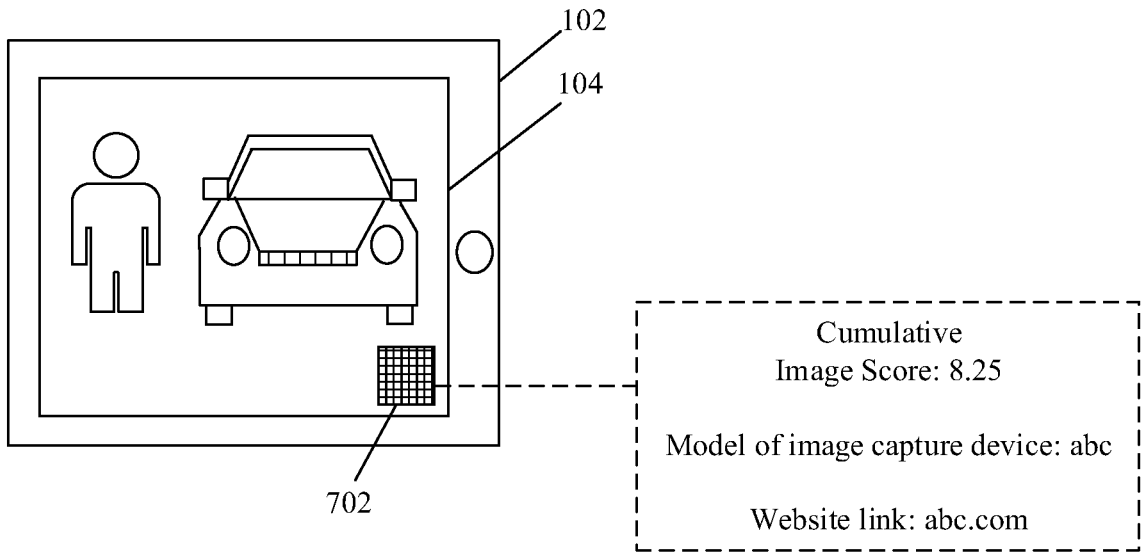
FIG. 7A and FIG. 7B, collectively, illustrate generation of a quick response (QR) code to indicate an image score used in video quality enhancement, in accordance with an embodiment of the disclosure.
Figure 7B:
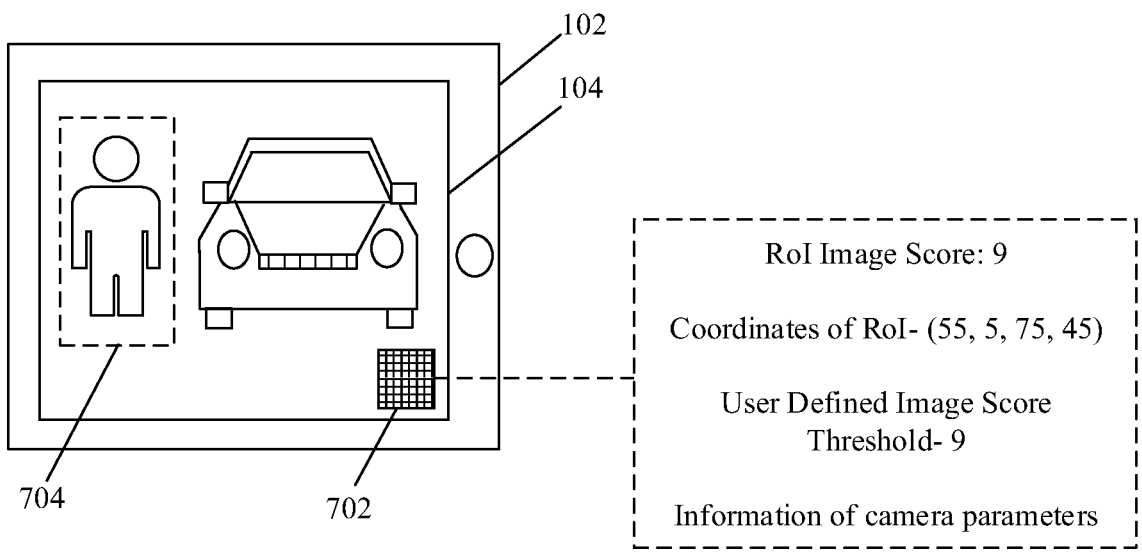

FIGS. 7A and 7B, collectively, illustrate generation of a quick response (QR) code, in accordance with an embodiment of the disclosure. FIG. 7A and FIG. 7B are explained in conjunction with elements from FIGS. 1, 2, 3A, 3B, 4, 5 and 6. With reference to FIG. 7A, there is shown the first image capture device 102, the display 104, and a QR code 702. The processor 202 may be configured to generate the QR code 702. The QR code 702 may be a two dimensional barcode that contains embedded information. The generated QR code 702 may include the determined cumulative image score associated with a video or an image. The generated QR code 702 may further include a plurality of physical attributes of the first image capture device 102, such as the model name, model number, details of the manufacturer of the first image capture device 102, link of the website of the first image capture device 102, and the like. The link may be used to further know about the product used to capture the image or video. The processor 202 may be configured to embed the generated QR code 702 on at least an image of the video to preserve information associated with the capture of the video.

With reference to FIG. 7B, there is shown the first image capture device 102, the display 104, the QR code 702, and a RoI 704. The QR code 702 may also include a RoI image score that may be determined for the RoI 704 by the processor 202 (for example, the RoI image score determined for the first RoI 508 as shown in FIG. 5). The QR code 702 may include information related to the coordinate of the RoI 704 in a 2D space. The QR code 702 may further include the user-defined image score threshold that was set for capturing the video by the first image capture device 102. The QR code 702 may include the information related to the camera settings and the camera parameters that was utilized to capture the video or image by the first image capture device 102. The generated QR code 702 may be utilized by other users to capture another video with the same camera setting and the same cumulative image score as that of the captured video. The processor 202 may be configured to embed the generated QR code 702 on at least an image of the video to preserve information associated with the capture of the video. The QR code 702 embedded in the image or a video may also be shared on social media platforms by the first user 110 that may be utilized by other users to capture similar video or image using the camera setting of the first image capture device 102 stored in the QR code 702.

Figure 8A:
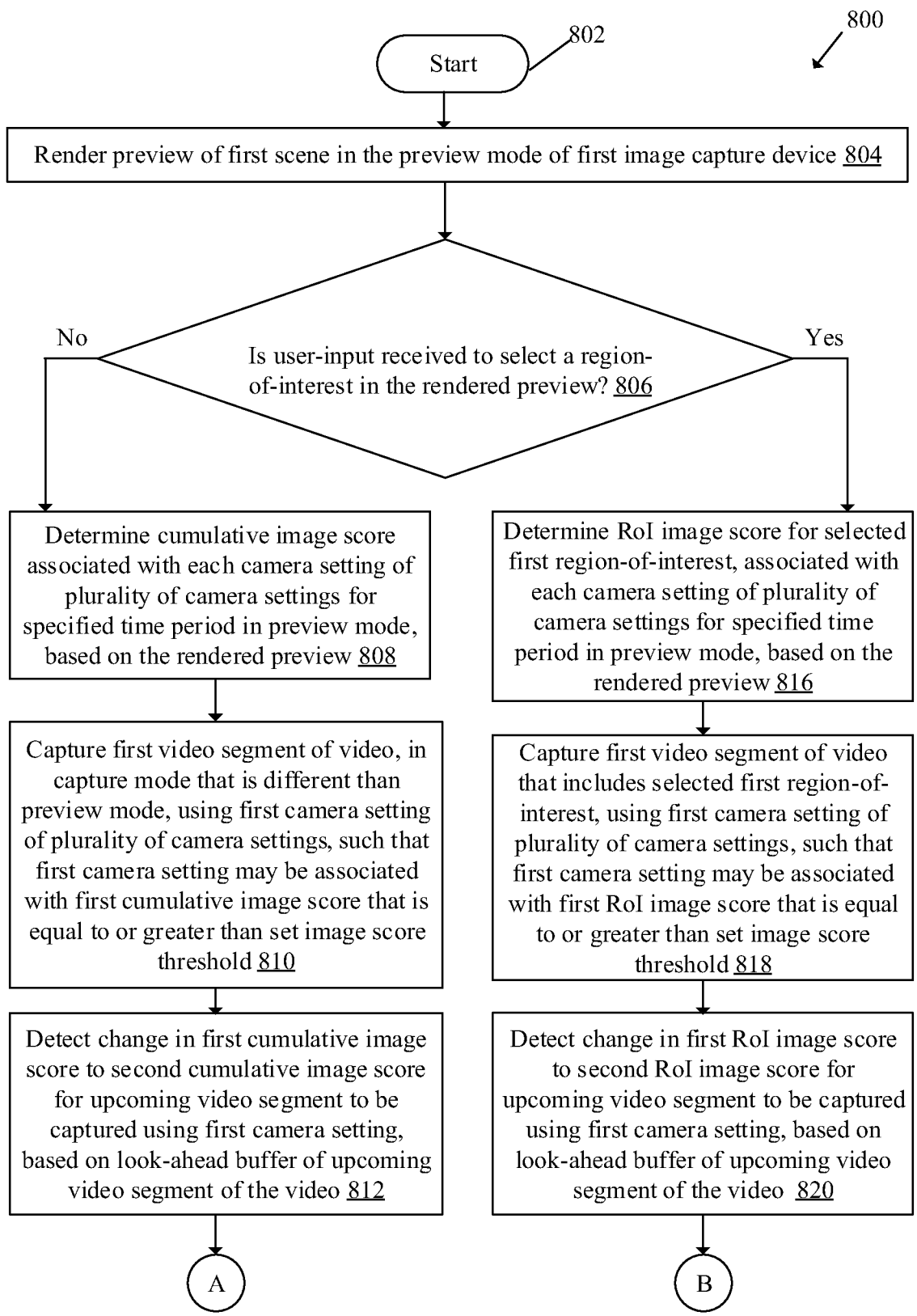
FIG. 8A, FIG. 8B and FIG. 8C, collectively, depict a flowchart that illustrates exemplary operations for image score-based video quality enhancement, in accordance with an embodiment of the disclosure.
Figure 8B:
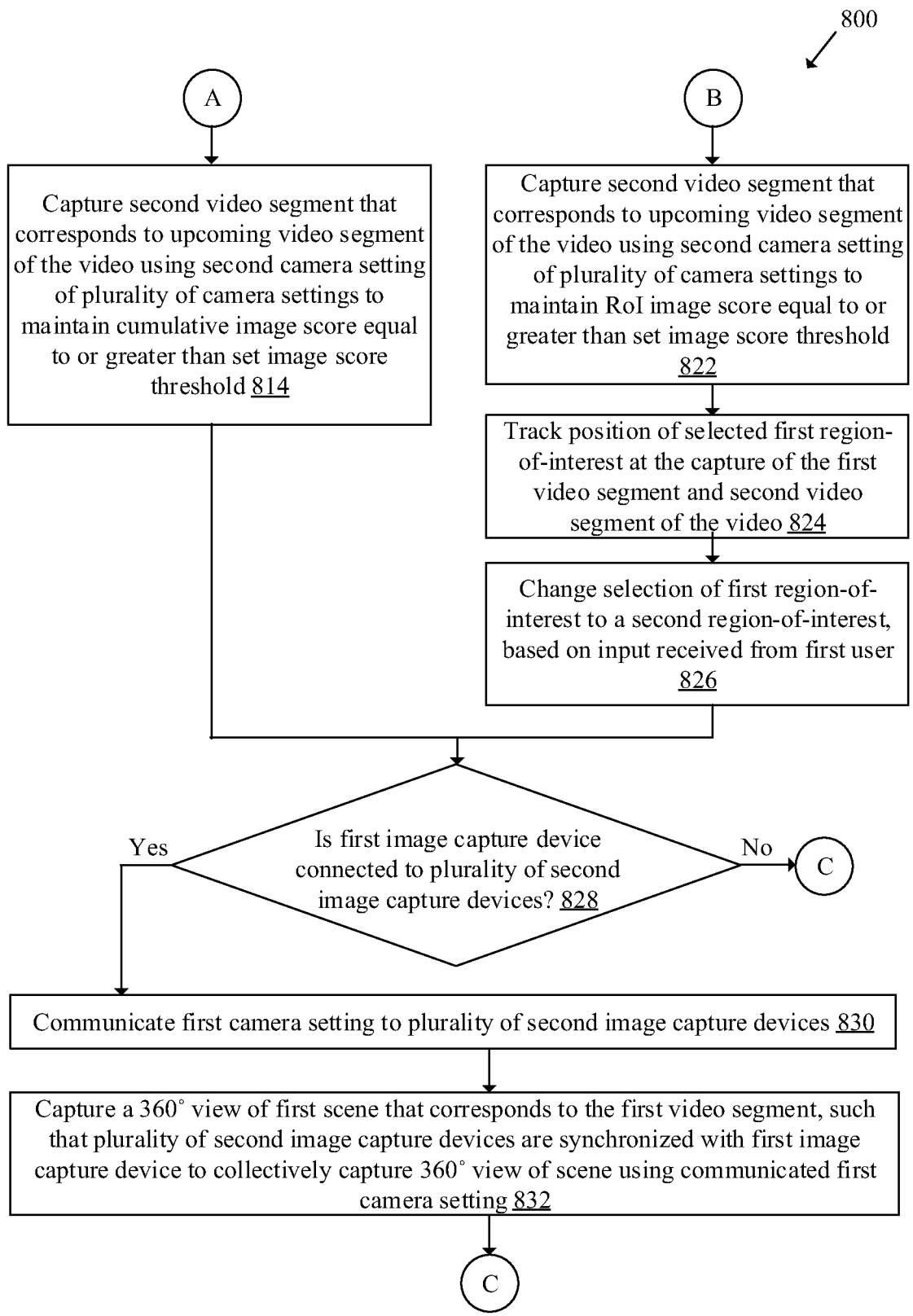
Figure 8C:
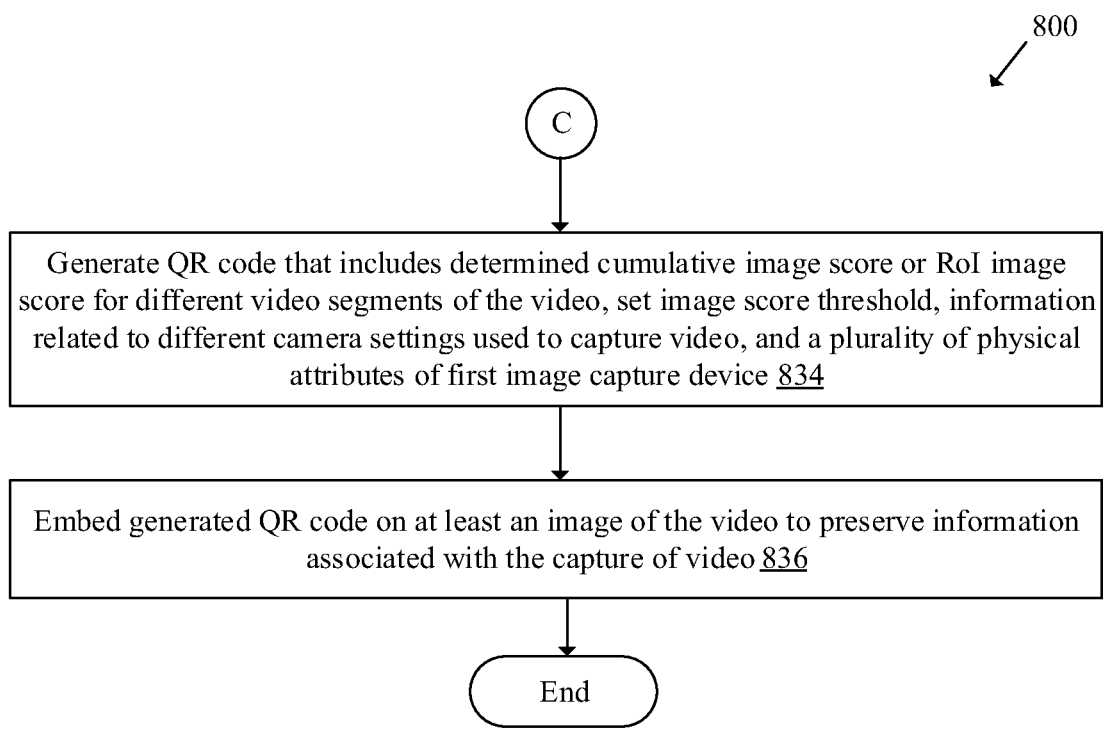

FIGS. 8A, 8B, and 8C collectively, depict a flowchart that illustrates exemplary operations for image score-based video quality enhancement, in accordance with an embodiment of the disclosure. With reference to FIGS. 8A, 8B and 8C, there is shown a flowchart 800. The flowchart 800 is described in conjunction with FIGS. 1, 2, 3A, 3B, 4, 5, 6 and 7. The operations from 804 to 836 may be implemented in the first image capture device 102. The operations of the flowchart 800 may start at 802 and proceed to 804.

At 804, a preview of the scene 112 may be rendered in the preview mode of the first image capture device 102. The display 104 may be configured to render the preview if the scene 112 in the preview mode of the first image capture device 102. At 806, it is determined whether a user-input is received to select a first RoI in the rendered preview of the scene 112 on the display 104. In cases where the user-input is not received, the control passes to 808. In cases where the user-input is received for selection of the first RoI (e.g., the first RoI 508; FIG. 5), the control passes to 816.

At 808, a cumulative image score associated with each camera setting of a plurality of camera settings may be determined for a specified time period in the preview mode, based on the rendered preview. The image score generator 204 may be configured to determine the cumulative image score associated with each camera setting of the plurality of camera settings. Each camera setting may be a different combination of a plurality of camera parameters. The determined cumulative image score may be indicative of a quality level of each video frame in the rendered preview of the scene 112. The cumulative image score may be determined based on the values of the plurality of camera parameters for each camera setting. The image score generator 204 may be configured to determine a score for each camera parameter for each rendered image of the rendered preview in the preview mode. The processor 202 may be further configured to modify a value of a first camera parameter of the plurality of camera parameters when the determined score of the first camera parameter may be a lowest score among a plurality of scores for the plurality of camera parameters. The value of the first camera parameter may be modified to generate at least one camera setting of the plurality of camera settings. The determination of the cumulative image score associated with each camera setting of the plurality of camera setting has been shown and described, for example, in the processing pipeline in FIG. 3A.

At 810, a first video segment of a video may be captured in the capture mode that is different from the preview mode, using a first camera setting of the plurality of camera settings, where the first camera setting may be associated with a first cumulative image score that is equal to or greater than a set image score threshold. The processor 202 may be configured to capture the first video segment, using the first camera setting, associated with the first cumulative image score in the capture mode of the first image capture device 102. The first cumulative image score may indicate the first quality level of the first video segment captured using the first camera setting. The capture of the first video segment of the video using the first camera setting has been shown and described, for example, in FIG. 4.

At 812, a change may be detected in the first cumulative image score to a second cumulative image score for an upcoming video segment to be captured using the first camera setting, based on a video buffer of the upcoming video segment of the video. The processor 202 may be configured to detect the change in the first cumulative image score to the second cumulative image score. The second cumulative image score may be less than the set image score threshold and the first cumulative image score. The second cumulative image score threshold may indicate a second quality level of the upcoming video segment that may be less than the first quality level. The detection of the change in the first cumulative score to the second cumulative image score for the upcoming video segment has been shown and described, for example, in FIG. 4.

At 814, a second video segment that corresponds to the upcoming video segment of the video may be captured using a second camera setting of the plurality of camera settings to maintain the cumulative image score equal to or greater than the set image score threshold. The processor 202 may be configured to capture the second video segment of the video using the second camera setting. The capture of the second video segment of the video using the second camera setting has been shown and described, for example, in FIG. 4.

At 816, a RoI image score may be determined for the selected first RoI, associated with each camera setting of the plurality of camera settings for the specified time period in the preview mode, based on the rendered preview. The image score generator 204 may be configured to determine the RoI image score for the selected first RoI, such as the first RoI 508, of the plurality of RoIs. The RoI image score may indicate a quality of the selected first RoI in the captured video. In accordance with an embodiment, the image score generator 204 may be configured to determine the RoI image score for each of the plurality of RoIs. The determination of the RoI image score for the first RoI has been shown and described, for example, in FIG. 5.

At 818, the first video segment of the video that includes the selected first RoI, may be captured using first camera setting of plurality of camera settings, where the first camera setting may be associated with first RoI image score that is equal to or greater than set image score threshold. The processor 202 may be configured to capture the first video segment using the first camera setting. The first RoI image score may indicate a first quality level of the selected first RoI, such as the first RoI 508 in the captured first video segment of the video. The capture of the first video segment of the video that includes the selected first RoI has been shown and described, for example in FIG. 5.

At 820, a change may be detected in the first RoI image score to a second RoI image score for an upcoming video segment to be captured using the first camera setting, based on a video buffer of the upcoming video segment of the video. The processor 202 may be configured to detect the change in the first RoI image score to the second RoI image score. The second RoI image score may be less than the set image score threshold and the first RoI image score. The second RoI image score threshold may indicate a second quality level of the selected first RoI in the upcoming video segment that may be less than the first quality level.

At 822, the second video segment that corresponds to the upcoming video segment of the video may be captured using a second camera setting of the plurality of camera settings to maintain the RoI image score equal to or greater than the set image score threshold. The processor 202 may be configured to capture the second video segment of the video using the second camera setting.

At 824, the position of the selected first RoI may be tracked at the capture of the first video segment and the second video segment of the video. The processor 202 may be configured to track the position of the selected first RoI, such as the first RoI 508. The position of the first RoI may be tracked based on the coordinates of the first RoI in the 2D space.

At 826, selection of the first RoI may be changed to a second-RoI, based on a user input. The processor 202 may be configured to change the selection of the first RoI, such as the first RoI 508, to a second RoI. In accordance with an embodiment, the processor 202 may be configured to change the selection of the first RoI to the second RoI when the first RoI may be no longer present in the video frame of the captured video.

At 828, it is determined whether the first image capture device 102 is connected to a plurality of second image capture devices. In accordance with an embodiment, the processor 202 may be configured to check whether the first image capture device 102 is connected to the plurality of second image capture devices. In cases where the first image capture device 102 is connected to the plurality of second image capture devices, the control passed to 830. In cases where the first image capture device 102 is not connected to the plurality of second image capture devices, the control passes to 834.

At 830, the first camera setting may be communicated to the plurality of second image capture devices. The first image capture device 102 may be configured to communicate the first camera setting associated with the first cumulative image score to the plurality of second image capture devices. In such a case, the first cumulative image score may be a maximum cumulative image score. For example, as shown in FIG. 6, the first camera 602 is connected to the plurality of second cameras 604, where the first camera 602 may be configured to communicate the first camera setting 608 associated with the first cumulative image score 608A, which may be the maximum cumulative image sore, to the plurality of second cameras 604.

At 832, a 360° view of a scene that may correspond to the first video segment, may be captured such that the plurality of second image capture devices are synchronized with the first image capture device 102 to collectively capture the 360° view of the scene. The first image capture device 102 may be synchronized with the plurality of second image capture devices to capture the 360° view of the scene using the communicated first camera setting. The capture of the 360° view of the scene has been shown and described, for example, in FIG. 6.

At 834, a quick response (QR) code may be generated for the captured video. The QR code may include the determined cumulative image score or the RoI image score for different video segments of the video, the set image score threshold, information related to different camera settings used to capture the video, and a plurality of physical attributes of the first image capture device. The generated QR code, such as the QR code 702, may be utilized by the first user 110 to improve the quality of captured video by keeping a track of the cumulative image scores associated with different video segments of the captured video and changing the values of the plurality of camera parameters to achieve better quality of the video. The generated QR code 702 may be stored in the server 106.

At 836, the generated QR code may be embedded on at least an image of the video to preserve information associated with the capture of the video. The processor 202 may be configured to embed the QR code on at least an image of the video. In such a case, if the video is shared on a social media platform, other users may utilize the information stored in the QR code to capture a video or an image with the same cumulative image scores. The control may pass to end.

Exemplary aspects of the disclosure may include a first image capture device (such as the first image capture device 102) that includes a display (such as the display 104) configured to render a preview of a scene in a preview mode of the first image capture device. The first image capture device may further include a processor (such as the processor 202) configured to determine a cumulative image score associated with each camera setting of a plurality of camera settings for a specified time period in the preview mode, based on the rendered preview. Each camera setting of the plurality of camera settings may be a different combination of a plurality of camera parameters. The cumulative image score may be indicative of a quality level of each video frame in the rendered preview. The processor may be further configured to capture a first video segment of a video, in a capture mode that is different from the preview mode, using a first camera setting of the plurality of camera settings. The first camera setting may be associated with a first cumulative image score that is equal to or greater than a set image score threshold. The first cumulative image score may indicate a first quality level of the first video segment captured using the first camera setting. The processor may be configured to detect a change in the first cumulative image score to a second cumulative image score for an upcoming video segment to be captured using the first camera setting, based on a video buffer of the upcoming video segment of the video. The second cumulative image score may be less than the set image score threshold and may indicate a second quality level of the upcoming video segment that is less than the first quality level. The processor may be configured to capture a second video segment that may correspond to the upcoming video segment of the video using a second camera setting of the plurality of camera settings to maintain the cumulative image score equal to or greater than the set image score threshold and at least the first quality level.

In accordance with an embodiment, the plurality of camera parameters may correspond to at least two of an exposure value, a sharpness value, a shutter speed value, or a camera ISO value. Furthermore, the set image score threshold may be at least one of a user-defined image score threshold in the preview mode or a default image score threshold value preset by a manufacturer of the image capture device. In accordance with an embodiment, the processor may be configured to determine a score for each camera parameter of the plurality of camera parameters for each rendered image of the rendered preview in the preview mode. The processor may be further configured to modify a value of a first camera parameter of the plurality of camera parameters when the determined score of the first camera parameter is a lowest score among a plurality of scores for the plurality of camera parameters. The value of the first camera parameter may be modified to generate at least one camera setting of the plurality of camera settings.

In accordance with an embodiment, the processor may be configured to monitor the cumulative image score associated with different image frames of the first video segment captured using the first camera setting. The processor may be further configured to update the first camera setting to the second camera setting when the cumulative image score falls below the set image score threshold. In accordance with an embodiment, the processor may be configured to receive a user input to select a plurality of RoIs in the rendered preview on the display. The processor may be further configured to set a different image score threshold for each of the plurality of RoIs. The set different image score thresholds for each of the plurality of RoIs, may be at least one of a user-defined image score threshold in the preview mode or a default image score threshold value preset by a manufacturer of the image capture device.

The processor may be configured to track a position of each of the plurality of RoIs at the capture of the first video segment of the video. The processor may be further configured to update the first setting used to capture the first video segment to the second setting based on a change in the tracked position of at least one of the plurality of RoIs. The first setting may be updated when the change in the tracked position further causes a change in an image score for at least one region-of-interest of the plurality of region-of-interests in the first video segment. The processor may be further configured to receive a user input to change a selection of at least one region-of interest of the plurality of RoIs at the capture of the video.

In accordance with an embodiment, the processor may be configured to communicate the first camera setting of the plurality of camera settings to a plurality of second image capture devices. The plurality of second image capture devices may be synchronized with first image capture device to collectively capture a 360° view of a scene using the communicated first camera setting. The 360° view of a scene may correspond to the first video segment of the video. In accordance with an embodiment, the processor may be configured to detect a maximum cumulative image score associated with a camera setting of at least one image capture device from the first image capture device and the plurality of second image capture devices. The processor may be configured to detect the maximum cumulative image score based on an evaluation of the captured video in a post-processing stage.

The processor may be configured to apply the camera setting associated with the detected maximum cumulative image score to a plurality of images captured from the first image capture device and the plurality of second image capture devices in the post-processing stage. The processor may be further configured to generate a new video based on a stitch operation of the plurality of images in an equi-rectangular format in the post-processing stage. In accordance with an embodiment, the processor may be configured to generate a QR code that may include the determined cumulative image score for different video segments of the video and the set image score threshold. The QR code may further include information related to different camera settings used to capture the video and a plurality of physical attributes of the first image capture device. The processor may be further configured to embed the generated QR code on at least an image of the video to preserve information associated with the capture of the video.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits. The set of instructions may be executable by the machine and/or the computer to perform the steps that may comprise render of a preview of a scene on a display in a preview mode. A cumulative image score associated with each camera setting of a plurality of camera settings may be determined for a specified time period in the preview mode, based on the rendered preview. Each camera setting may be a different combination of a plurality of camera parameters. The cumulative image score may be indicative of a quality level of each video frame in the rendered preview. A first video segment of a video may be captured, in a capture mode that is different than the preview mode, using a first camera setting of the plurality of camera settings. The first camera setting may be associated with a first cumulative image score that is equal to or greater than a set image score threshold. The first cumulative image score may indicate a first quality level of the first video segment captured using the first camera setting. A change may be detected in the first cumulative image score to a second cumulative image score for an upcoming video segment to be captured using the first camera setting, based on a video buffer of the upcoming video segment of the video. The second cumulative image score may be less than the set image score threshold and indicates a second quality level of the upcoming video segment that may be less than the first quality level. A second video segment that may correspond to the upcoming video segment of the video may be captured using a second camera setting of the plurality of camera settings to maintain the cumulative image score equal to or greater than the set image score threshold and at least the first quality level.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims

What is claimed is:

1. A first image capture device, comprising:
a display configured to render a preview of a scene in a preview mode; and
a processor configured to:
determine a cumulative image score associated with each camera setting of a plurality of camera settings for a specific time period in the preview mode, based on the rendered preview, wherein
each camera setting of the plurality of camera settings is a different combination of a plurality of camera parameters, and
the cumulative image score is indicative of a quality level of each video frame in the rendered preview;
capture a first video segment of the scene as a video, in a capture mode that is different than the preview mode, using a first camera setting of the plurality of camera settings, wherein
the first camera setting is associated with a first cumulative image score that is equal to or greater than a set image score threshold, and
the first cumulative image score indicates a first quality level of the first video segment;
detect a change in the first cumulative image score to a second cumulative image score for an upcoming video segment to be captured using the first camera setting, wherein
the change in the first cumulative image score to the second cumulative image score is detected based on a video buffer of the upcoming video segment of the video,
the second cumulative image score indicates a second quality level of the upcoming video segment, and
the second cumulative image score is less than the set image score threshold;
capture a second video segment of the video using a second camera setting of the plurality of camera settings to maintain the cumulative image score equal to or greater than the set image score threshold, wherein the second video segment corresponds to the upcoming video segment of the video;
communicate the first camera setting to a plurality of second image capture devices, wherein
the plurality of second image capture devices is synchronized with the first image capture device to collectively capture a 360° view of the scene based on the communicated first camera setting, and
the 360° view of the scene corresponds to the first video segment of the video;
detect a maximum cumulative image score associated with a camera setting of at least one image capture device from the first image capture device and the plurality of second image capture devices, based on an evaluation of the video in a post-processing stage;
apply the camera setting associated with the detected maximum cumulative image score to a plurality of images captured from the first image capture device and the plurality of second image capture devices in the post-processing stage; and
generate a new video based on a stitch operation of the plurality of images in the post-processing stage.

2. The first image capture device according to claim 1, wherein the plurality of camera parameters corresponds to at least two of an exposure value, a sharpness value, a shutter speed value, or a camera ISO value.

3. The first image capture device according to claim 1, wherein the set image score threshold is at least one of a user-defined image score threshold in the preview mode or a default image score threshold value by a manufacturer of the first image capture device.

4. The first image capture device according to claim 1, wherein the processor is further configured to determine a score for each camera parameter of the plurality of camera parameters for each rendered image of the rendered preview in the preview mode.

5. The first image capture device according to claim 4, wherein
the processor is further configured to modify a value of a first camera parameter of the plurality of camera parameters based on the determined score of the first camera parameter that is a lowest score among a plurality of scores for the plurality of camera parameters, and the value of the first camera parameter is modified to generate at least one camera setting of the plurality of camera settings.

6. The first image capture device according to claim 1, wherein the processor is further configured to:
monitor the cumulative image score associated with different image frames of the first video segment captured using the first camera setting; and
update the first camera setting to the second camera setting based on the cumulative image score that is below the set image score threshold.

7. The first image capture device according to claim 1, wherein the processor is further configured to receive a user input to select a plurality of region-of-interests in the rendered preview on the display.

8. The first image capture device according to claim 7, wherein
the processor is further configured to set a different image score threshold for each region of interest of the plurality of region-of-interests, and
the set different image score threshold is at least one of a user-defined image score threshold in the preview mode or a default image score threshold value by a manufacturer of the first image capture device.

9. The first image capture device according to claim 7, wherein the processor is further configured to:
track a position of each of the plurality of region-of-interests at the capture of the first video segment of the video; and
update the first camera setting to the second camera setting based on
a change in the tracked position of at least one of the plurality of region-of-interests, and
a change in an image score for at least one region-of-interest of the plurality of region-of-interests in the first video segment, wherein the change in the image score for at least one region-of-interest is based on the change in the tracked position of at least one of the plurality of region-of-interests.

10. The first image capture device according to claim 7, wherein the processor is further configured to receive a user input to change a selection of at least one region-of interest of the plurality of region-of-interests at the capture of the video.

11. The first image capture device according to claim 1, wherein the processor is further configured to generate a quick response (QR) code that includes the determined cumulative image score for different video segments of the video, the set image score threshold, information related to the plurality of camera settings, and a plurality of physical attributes of the first image capture device.

12. The first image capture device according to claim 11, wherein the processor is further configured to embed the generated QR code on at least an image of the video to preserve information associated with the capture of the video.

13. A method, comprising:
in an image capture device comprising a display and a processor:
rendering, by the display, a preview of a scene through a viewfinder of the image capture device in a preview mode;
determining, by the processor, a cumulative image score associated with each camera setting of a plurality of camera settings for a specific time period in the preview mode, based on the rendered preview, wherein each camera setting of the plurality of camera settings is a different combination of a plurality of camera parameters, and
the cumulative image score is indicative of a quality level of each video frame in the rendered preview;
capturing, by the processor, a first video segment of the scene as a video, in a capture mode that is different than the preview mode, using a first camera setting of the plurality of camera settings, wherein
the first camera setting is associated with a first cumulative image score that is equal to or greater than a set image score threshold, and
the first cumulative image score indicates a first quality level of the first video segment;
detecting, by the processor, a change in the first cumulative image score to a second cumulative image score for an upcoming video segment to be captured using the first camera setting, wherein
the change in the first cumulative image score to the second cumulative image score is detected based on a video buffer of the upcoming video segment of the video,
the second cumulative image score indicates a second quality level of the upcoming video segment, and
the second cumulative image score is less than the set image score threshold;
capturing, by the processor, a second video segment of the video using a second camera setting of the plurality of camera settings to maintain the cumulative image score equal to or greater than the set image score threshold, wherein the second video segment corresponds to the upcoming video segment of the video;
communicating, by the processor, the first camera setting to a plurality of second image capture devices, wherein
the plurality of second image capture devices is synchronized with the first image capture device to collectively capture a 360° view of the scene based on the communicated first camera setting, and
the 360° view of the scene corresponds to the first video segment of the video;
detecting, by the processor, a maximum cumulative image score associated with a camera setting of at least one image capture device from the first image capture device and the plurality of second image capture devices, based on an evaluation of the video in a post-processing stage;
applying, by the processor, the camera setting associated with the detected maximum cumulative image score to a plurality of images captured from the first image capture device and the plurality of second image capture devices in the post-processing stage; and
generating, by the processor, a new video based on a stitch operation of the plurality of images in the post-processing stage.

14. The method according to claim 13, wherein the plurality of camera parameters corresponds to at least two of an exposure value, a sharpness value, a shutter speed value, or a camera ISO value.

15. The method according to claim 13, wherein the set image score threshold is at least one of a user-defined image score threshold in the preview mode or a default image score threshold value by a manufacturer of the image capture device.

16. The method according to claim 13, further comprising determining, by the processor, a score for each camera parameter of the plurality of camera parameters for each rendered image of the rendered preview in the preview mode.

17. The method according to claim 16, further comprising modifying, by the processor, a value of a first camera parameter of the plurality of camera parameters based on the determined score of the first camera parameter that is a lowest score among a plurality of scores for the plurality of camera parameters, wherein the value of the first camera parameter is modified to generate at least one camera setting of the plurality of camera settings.

18. The method according to claim 13, further comprising:
monitoring, by the processor, the cumulative image score associated with different image frames of the first video segment captured using the first camera setting; and
updating, by the processor, the first camera setting to the second camera setting based on the cumulative image score that is below the set image score threshold.

* * * * *